United States Patent
Sheng et al.

(10) Patent No.: US 12,367,322 B2
(45) Date of Patent: Jul. 22, 2025

(54) UEFI VARIABLE STORAGE SYSTEM

(71) Applicant: Dell Products L.P., Round Rock, TX (US)

(72) Inventors: Yu Cheng Sheng, Taoyuan (TW); Po-Yu Cheng, Tainan (TW); Yu Hsuan Yang, Taoyuan (TW); Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 18/133,775

(22) Filed: Apr. 12, 2023

(65) Prior Publication Data

US 2024/0346187 A1 Oct. 17, 2024

(51) Int. Cl.
*G06F 21/78* (2013.01)
*G06F 21/57* (2013.01)

(52) U.S. Cl.
CPC ............ *G06F 21/78* (2013.01); *G06F 21/575* (2013.01)

(58) Field of Classification Search
CPC ........... G06F 8/65; G06F 21/575; G06F 21/78
See application file for complete search history.

(56) References Cited

U.S. PATENT DOCUMENTS

| 9,923,926 | B1 | | 3/2018 | Banga et al. | |
|---|---|---|---|---|---|
| 10,776,131 | B2 | * | 9/2020 | Liu | ............ G06F 3/0679 |
| 2009/0119748 | A1 | * | 5/2009 | Yao | ............ G06F 21/57 726/2 |
| 2009/0319806 | A1 | * | 12/2009 | Smith | ............ G06F 21/575 726/19 |
| 2015/0074387 | A1 | * | 3/2015 | Lewis | ............ G06F 21/575 713/2 |
| 2018/0293061 | A1 | * | 10/2018 | Arms | ............ G06F 8/654 |
| 2022/0067161 | A1 | * | 3/2022 | Hayes | ............ H04L 63/061 |

\* cited by examiner

*Primary Examiner* — Shanto Abedin
(74) *Attorney, Agent, or Firm* — Joseph Mencher

(57) ABSTRACT

A UEFI variable storage system includes a UEFI variable services subsystem coupled to UEFI variable sources, a trusted UEFI variable storage subsystem, and an untrusted UEFI variable storage subsystem. If the UEFI variable services subsystem receives a first UEFI variable during a first UEFI initialization process from a first UEFI variable source and determines that the first UEFI initialization process has not reached an untrusted UEFI variable source point, it stores the first UEFI variable in the trusted UEFI variable storage subsystem. If the UEFI variable services subsystem receives a second UEFI variable during the first UEFI initialization process from a second UEFI variable source and determines that the first UEFI initialization process has reached the untrusted UEFI variable source point, it stores the second UEFI variable in the untrusted UEFI variable storage subsystem.

20 Claims, 16 Drawing Sheets

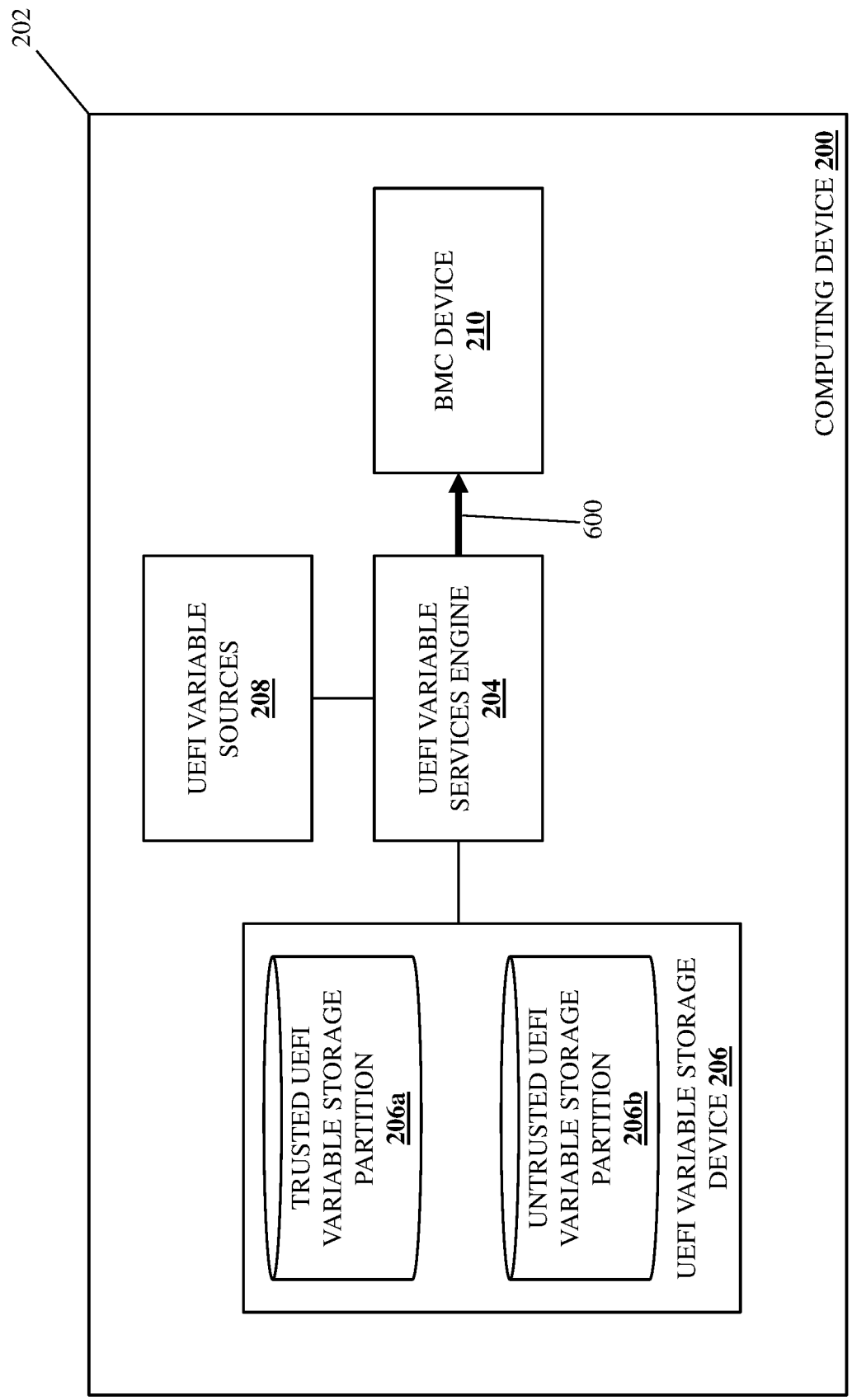

UEFI VARIABLE STORAGE SYSTEM

BACKGROUND

The present disclosure relates generally to information handling systems, and more particularly to storing UEFI variables used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, server devices, desktop computing devices, laptop/notebook computing devices, tablet computing devices, mobile phones, networking device (e.g., switch devices, router devices, etc.), storage systems, and/or other computing devices known in the art, are configured to perform a Unified Extensible Firmware Interface (UEFI) initialization/boot process that prepares the computing device for runtime operations. As will be appreciated by one of skill in the art in possession of the present disclosure, the UEFI initialization/boot process may be performed using UEFI firmware that provides UEFI variable services for UEFI variables such as a "SetVariable( )" UEFI variable service that stores UEFI variables for later use, a "GetVariable( )" UEFI service that retrieves UEFI variables that were previously stored, and/or other UEFI variable services known in the art. Such UEFI variable services are utilized with UEFI subsystems such as UEFI Secure Boot subsystems, UEFI Boot Manager subsystems, system configuration subsystems, and/ or other UEFI subsystems that may be used to protect the UEFI firmware and/or perform a variety of critical UEFI functions that are essential to the UEFI system. However, the conventional provisioning of UEFI variable services raises some issues.

For example, UEFI variables are conventionally stored in a non-volatile storage system such as a Basic Input/Output System (BIOS) Serial Peripheral Interface (SPI) storage device in the computing device, and the UEFI specification notes that such non-volatile storage systems will include limited storage space in many platforms, and thus recommends relatively limited use of UEFI variables (e.g., in cases where other means of communicating the associated information are not available). The inventors of the present disclosure have identified security vulnerabilities and other issues with the conventional storage of UEFI variables. For example, the non-volatile storage system in which UEFI variables are stored is subject to "flooding" (e.g., the provisioning of relatively large amounts of data for storage) by malicious drivers in order to fill up that non-volatile storage system and prevent legitimate drivers from storing or updating their UEFI variables or other data in that non-volatile storage system (often referred to as a "denial-of-service" attack). Such situations may require the reclamation of UEFI variable storage resources and can result in contention for the UEFI variable storage resources that can introduce unexpected UEFI system behavior, and the current development environment implementation for UEFI applications (called "EDK2") is not configured to notify a user when the non-volatile storage space used for UEFI variable storage is filled (or filling) up.

Accordingly, it would be desirable to provide a UEFI variable storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Unified Extensible Firmware Interface (UEFI) variable services engine that is configured to: receive, during a first UEFI initialization process from a first UEFI variable source, a first UEFI variable; determine, in response to receiving the first UEFI variable, that the first UEFI initialization process has not reached an untrusted UEFI variable source point and, in response, store the first UEFI variable in a trusted UEFI variable storage subsystem; receive, during the first UEFI initialization process from a second UEFI variable source, a second UEFI variable; and determine, in response to receiving the second UEFI variable, that the first UEFI initialization process has reached the untrusted UEFI variable source point and, in response, store the second UEFI variable in an untrusted UEFI variable storage subsystem.

BRIEF DESCRIPTION OF THE DRAWINGS

FIG. 6 is a schematic view illustrating an embodiment of the operation of the computing device of FIG. 2 during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
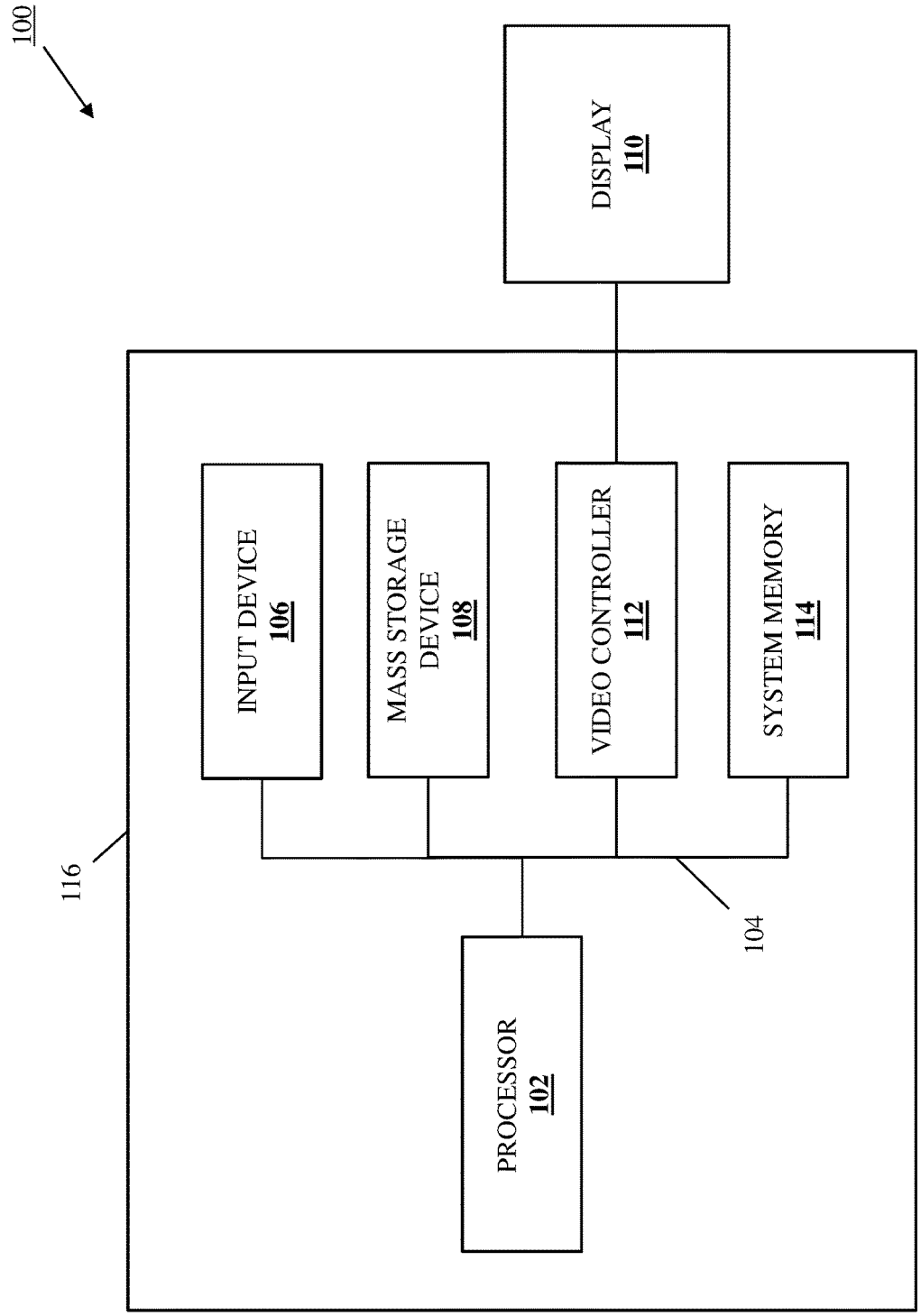
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
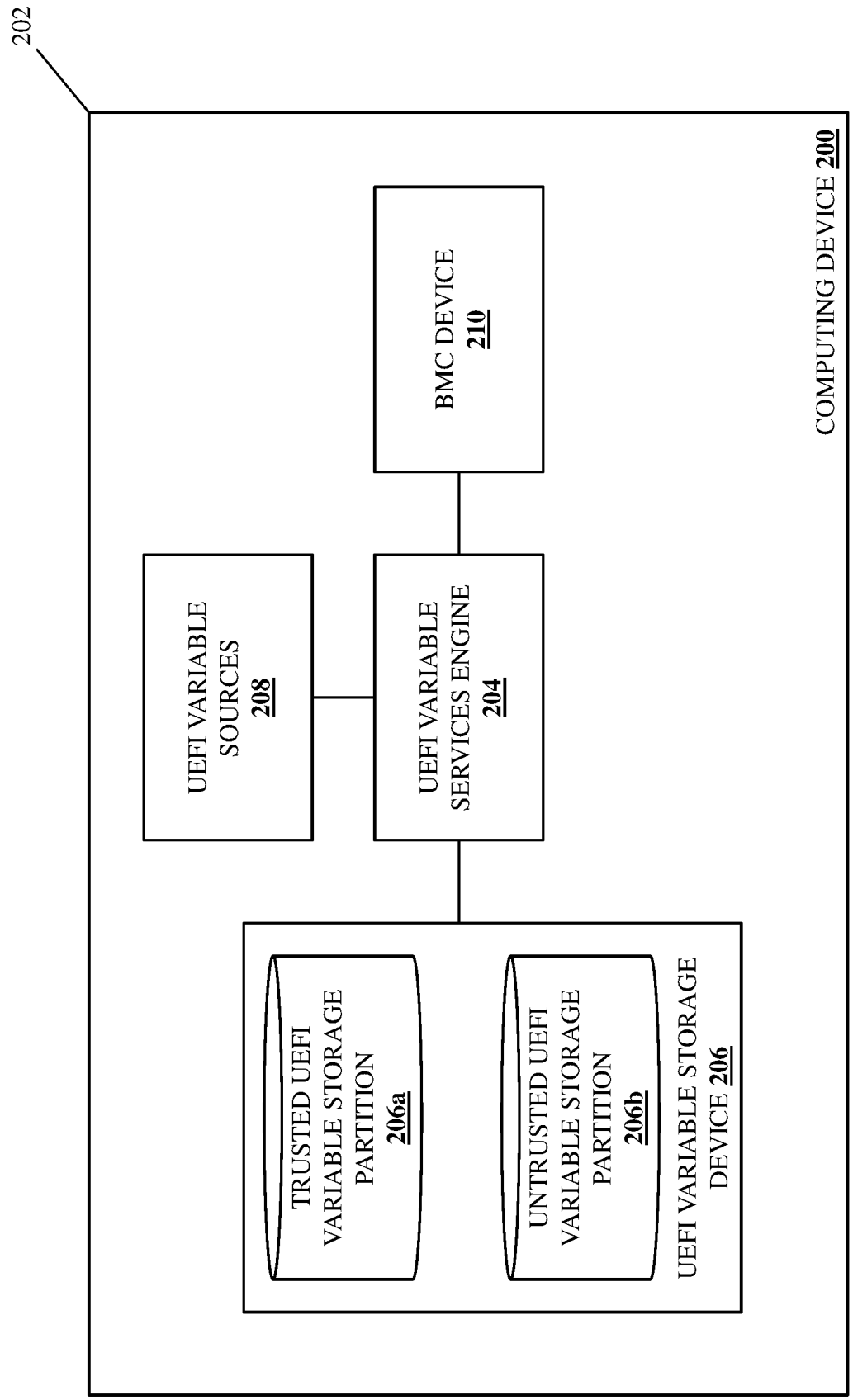
FIG. 2 is a schematic view illustrating an embodiment of a computing device that may include the UEFI variable storage system of the present disclosure.

Referring now to FIG. 2, an embodiment of a computing device 200 is illustrated that may include the UEFI variable storage system of the present disclosure. In an embodiment, the computing device 200 may be provided by the IHS 100 discussed above with reference to FIG. 1 and/or may include some or all of the components of the IHS 100, and in specific examples may be provided by server devices, desktop computing devices, laptop/notebook computing devices, tablet computing devices, mobile phones, networking device (e.g., switch devices, router devices, etc.), storage systems, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a UEFI variable services engine 204 that is configured to perform the functionality of the UEFI variable services engines, UEFI variable services subsystems, and/or computing devices discussed below. In a specific example, the UEFI variable services engine 204 may be provide by UEFI firmware that is configured to provide UEFI variable services (e.g., via UEFI variable services such as the "SetVariable( )" UEFI variable service and the "GetVariable( )" UEFI variable service discussed above, as well as any other UEFI variable services that would be apparent to one of skill in the art in possession of the present disclosure), although one of skill in the art in possession of the present disclosure will appreciate how a variety of different functionality may be enabled in the UEFI variable services engine 204 by a variety of processing/memory components while remaining within the scope of the present disclosure as well.

The chassis 202 may also house a UEFI variable storage device 206 that is coupled to the UEFI variable services engine 204 (e.g., via a coupling between the UEFI variable storage device 206 and the processing system described above). In the illustrated embodiment, the UEFI variable storage device 206 has been partitioned (e.g., during the manufacture of the computing device 200, during initialization of the computing device 200, etc.) to include a trusted UEFI variable storage partition 206a and an untrusted UEFI variable storage partition 206b that are discussed in further detail below. However, while a discrete trusted UEFI variable storage subsystem and a discrete untrusted UEFI variable storage subsystem are illustrated and described as being provided according to the teachings of the present disclosure via partitions in the same UEFI variable storage device 206, one of skill in the art in possession of the present disclosure will appreciate how the trusted UEFI variable storage subsystem and the untrusted UEFI variable storage subsystem of the present disclosure may be provided in a variety of manners (e.g., provided by or included in separate storage devices) that will fall within the scope of the present disclosure as well.

The chassis 202 may also house a plurality of UEFI variable sources 208 that are coupled to the UEFI variable services engine 204 (e.g., via a coupling between the UEFI variable sources 208 and the processing system described above) and that one of skill in the art in possession of the present disclosure will appreciate may be provided by BIOS/UEFI drivers and/or other sources of the UEFI variable described below. The chassis 202 may also house a Baseboard Management Controller (BMC) device 210 that is coupled to the UEFI variable services engine 204 (e.g., via a coupling between the BMC device 210 and the processing system described above) and that may be provided by an integrated DELL® Remote Access Controller (iDRAC) device available in computing devices provided by DELL® Inc. of Round Rock, Texas, United States, and/or other BMC devices that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the UEFI variable storage functionality discussed below, while remaining within the scope of the present disclosure as well.

Figure 3A:
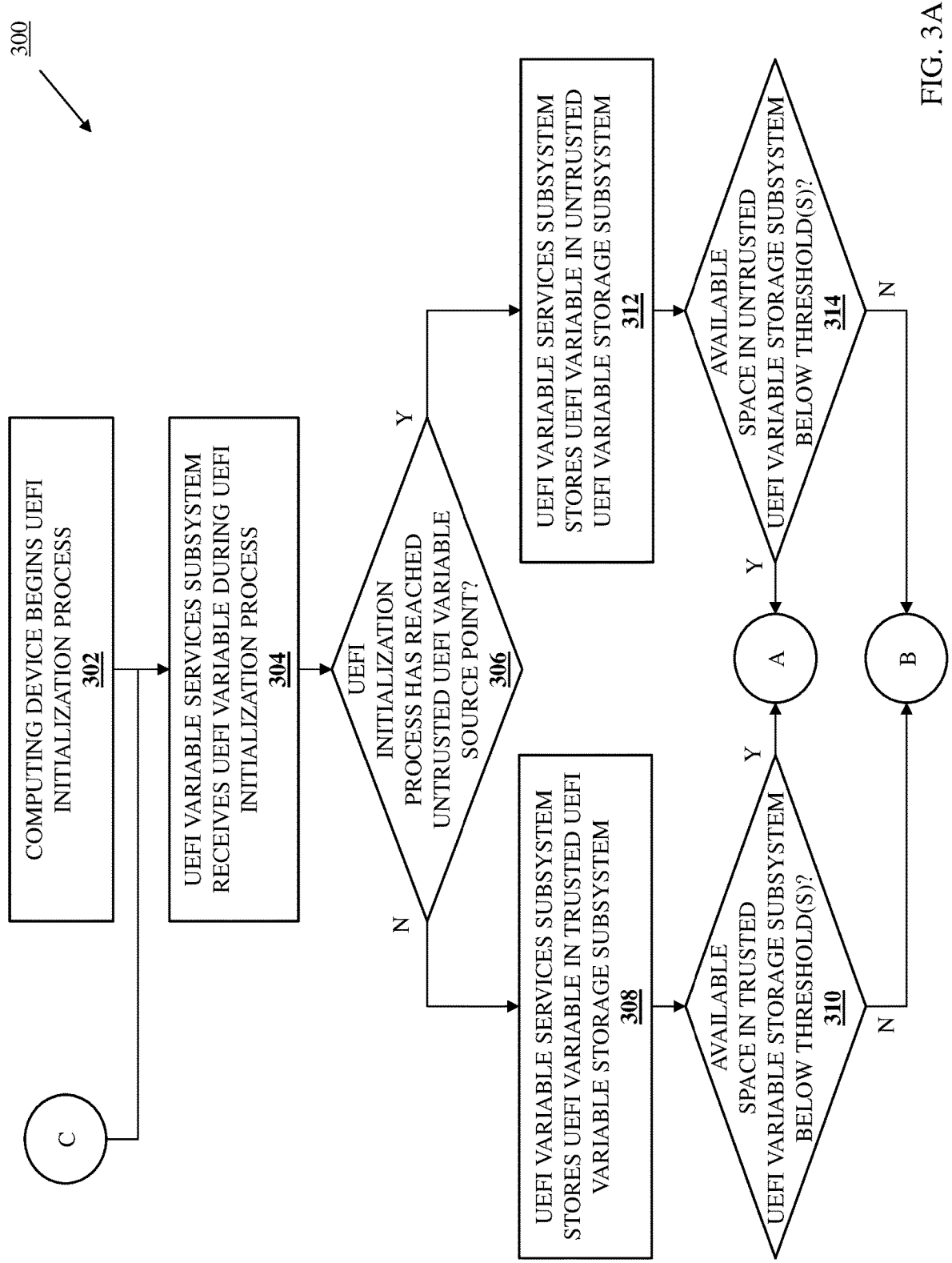
FIG. 3A is a flow chart illustrating an embodiment of a portion of a method for storing UEFI variables in a computing device.
Figure 3B:
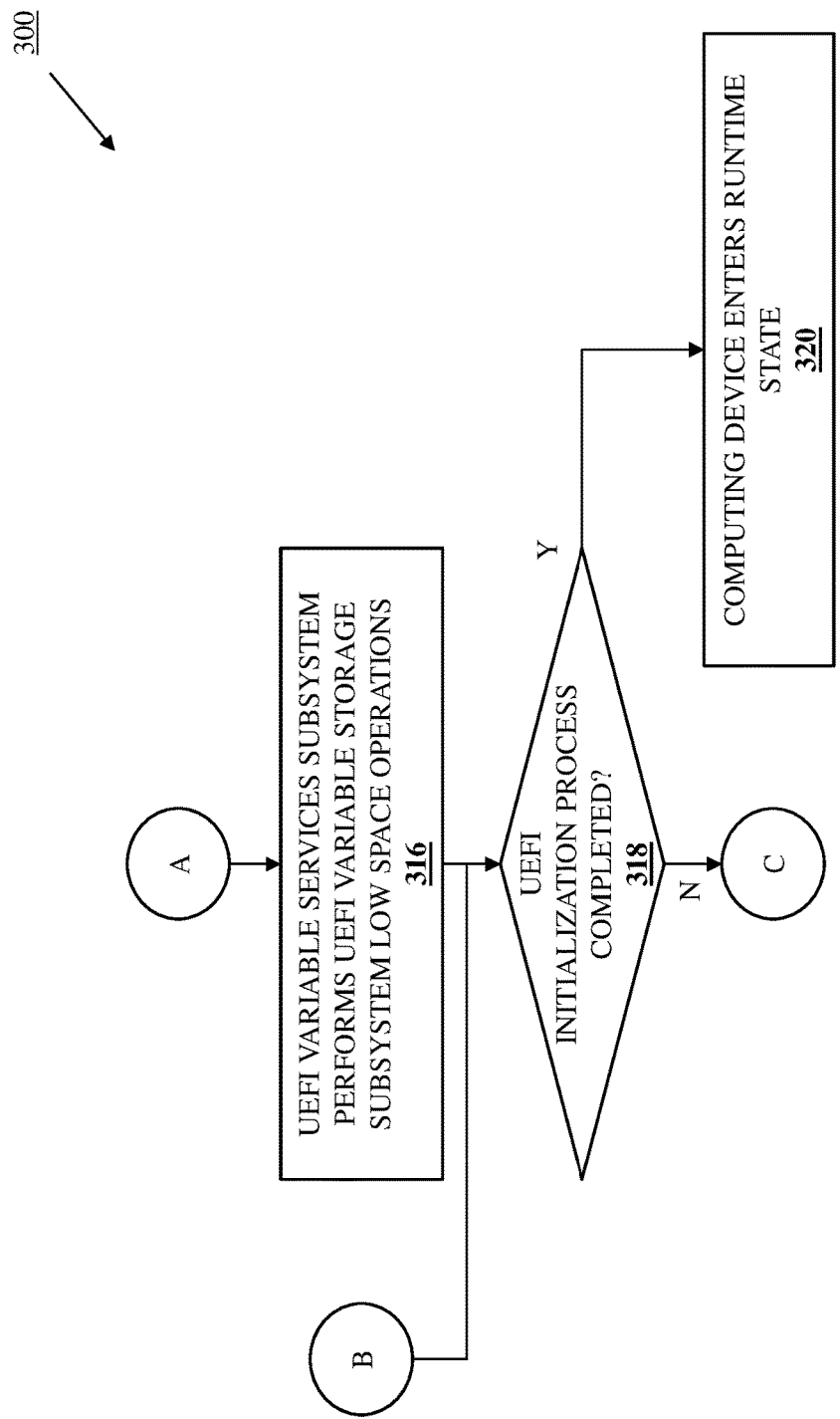
FIG. 3B is a flow chart illustrating an embodiment of a portion of a method for storing UEFI variables in a computing device.

Referring now to FIGS. 3A and 3B, an embodiment of a method 300 for storing UEFI variables in a computing device is illustrated. As discussed below, the systems and methods of the present disclosure provide separate/discrete storage subsystems for "trusted" UEFI variables received before an untrusted UEFI variable source point in a UEFI initialization process and "untrusted" UEFI variables received after the untrusted UEFI variable source point in a UEFI initialization process. For example, the UEFI variable storage system of the present disclosure may include a UEFI variable services subsystem coupled to UEFI variable sources, a trusted UEFI variable storage subsystem, and an untrusted UEFI variable storage subsystem. If the UEFI variable services subsystem receives a first UEFI variable during a first UEFI initialization process from a first UEFI variable source and determines that the first UEFI initialization process has not reached an untrusted UEFI variable source point, it stores the first UEFI variable in the trusted UEFI variable storage subsystem. If the UEFI variable services subsystem receives a second UEFI variable during the first UEFI initialization process from a second UEFI variable source and determines that the first UEFI initialization process has reached the untrusted UEFI variable source point, it stores the second UEFI variable in the untrusted UEFI variable storage subsystem. As such, "untrusted" UEFI variable sources that are provided relatively later in the UEFI initialization process are unable to fill the "trusted" UEFI variable storage subsystem with "untrusted" UEFI variables (e.g., in a denial-of-service attack), ensuring the availability of the "trusted" UEFI variables required to complete the UEFI initialization process.

The method 300 begins at block 302 where a computing device begins a UEFI initialization process. In an embodiment, at block 302, the computing device 200 may be powered on, reset, booted, and/or otherwise initialized such that UEFI initialization process begins in the computing device 200. As will be appreciated by one of skill in the art in possession of the present disclosure, the UEFI specification defines the provisioning of UEFI variable services during a Power-On Self-Test (POST) for the computing device 200 that is performed during the UEFI initialization process, as well as during runtime of the computing device 200 that follows the UEFI initialization process, and thus any of a variety of UEFI initialization operations (in addition to the UEFI variable storage operations described herein) may be performed as part of the UEFI initialization process that begins at block 302. As discussed above, the illustrated embodiments of the present disclosure provide for the partitioning of the UEFI variable storage device 206 (e.g., a BIOS SPI storage device) to provide the trusted UEFI variable storage partition 206*a* and the discrete untrusted UEFI variable storage partition 206*b* that are separate and discrete storage subsystems in the UEFI variable storage device 206, and such partitioning may have been performed during manufacture of the computing device 200 such that the trusted UEFI variable storage partition 206*a* and the untrusted UEFI variable storage partition 206*b* are available during the method 300. As will be appreciated by one of skill in the art in possession of the present disclosure, in some embodiments the trusted UEFI variable storage partition 206*a* may be provided with relatively less storage space from the UEFI variable storage device 206 than the untrusted UEFI variable storage partition 206*b* due to relatively lower storage requirements of the "trusted" UEFI variables required for to complete the UEFI initialization process as discussed below.

Figure 4A:
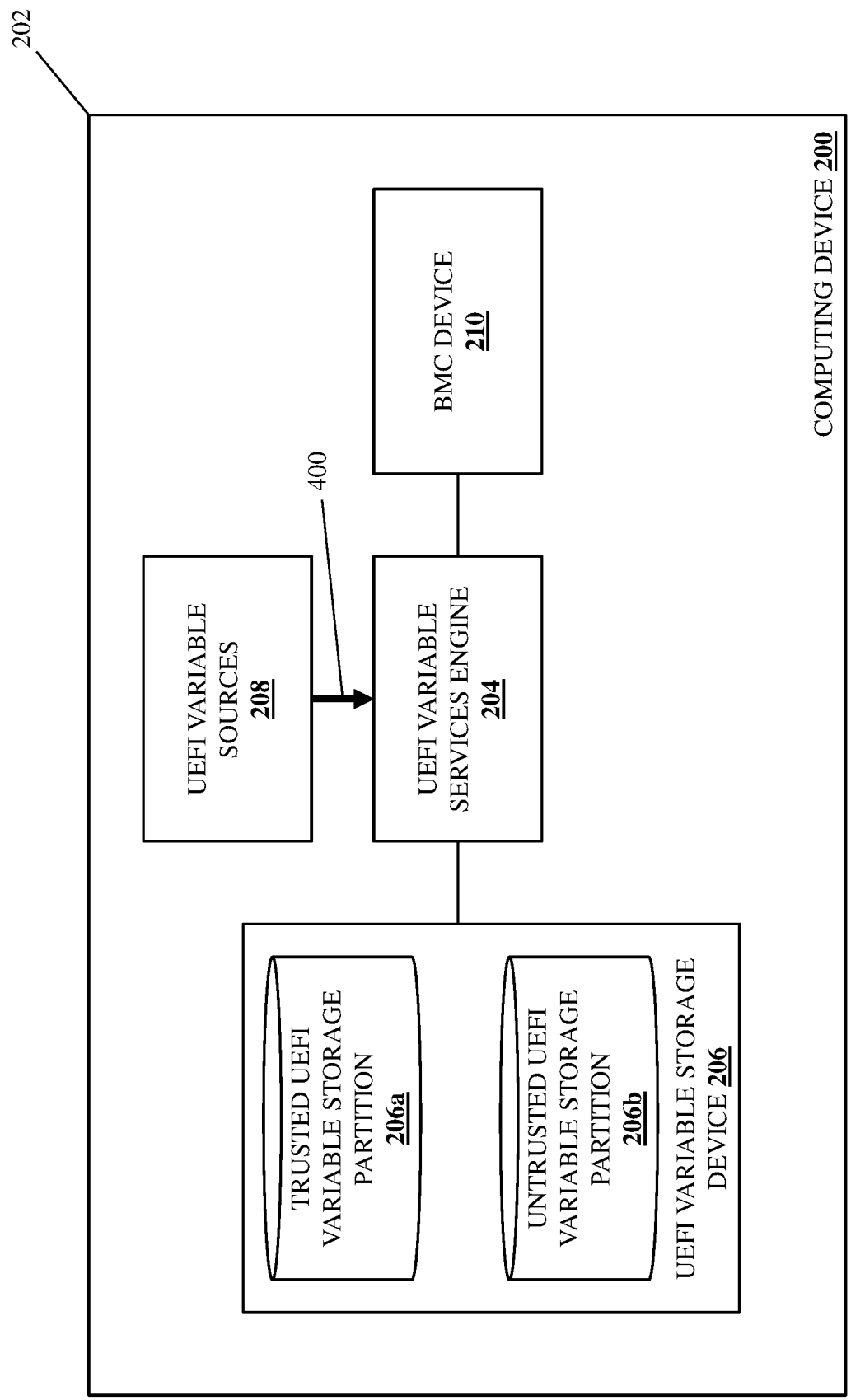
FIG. 4A is a schematic view illustrating an embodiment of the operation of the computing device of FIG. 2 during the method of FIG. 3.

The method 300 then proceeds to block 304 where a UEFI variable services subsystem receives a UEFI variable during the UEFI initialization process. With reference to FIG. 4A, in an embodiment of block 304, one of the UEFI variable sources 208 may perform UEFI variable provisioning operations 400 that may include generating/creating a UEFI variable and transmitting that UEFI variable such that it is received by the UEFI variable services engine 204 in the computing device 200. For example, at block 304, the UEFI variable source may utilize the "SetVariable( )" UEFI variable services provided by the UEFI variable services engine 204 to provide the UEFI variable. As discussed below and as will be appreciated by one of skill in the art in possession of the present disclosure, in examples in which the UEFI variable is received at block 304 relatively early in the UEFI initialization process (i.e., prior to the untrusted UEFI variable source point in the UEFI initialization process discussed below), that UEFI variable may be provided by "trusted" UEFI variable sources such as BIOS/UEFI drivers that are provided from the BIOS image itself, and may include secure boot signature databases, system configurations, and/or other UEFI variable information that may be configured for use by critical UEFI functions in the computing device 200 such as UEFI Secure Boot, UEFI Boot Manager, system configuration, and/or other UEFI initialization process operations that would be apparent to one of skill in the art in possession of the present disclosure and that may be utilized to protect the UEFI firmware, may be required to complete the UEFI initialization process, and/or otherwise may be essential to the operation of the computing device 200.

Figure 5A:
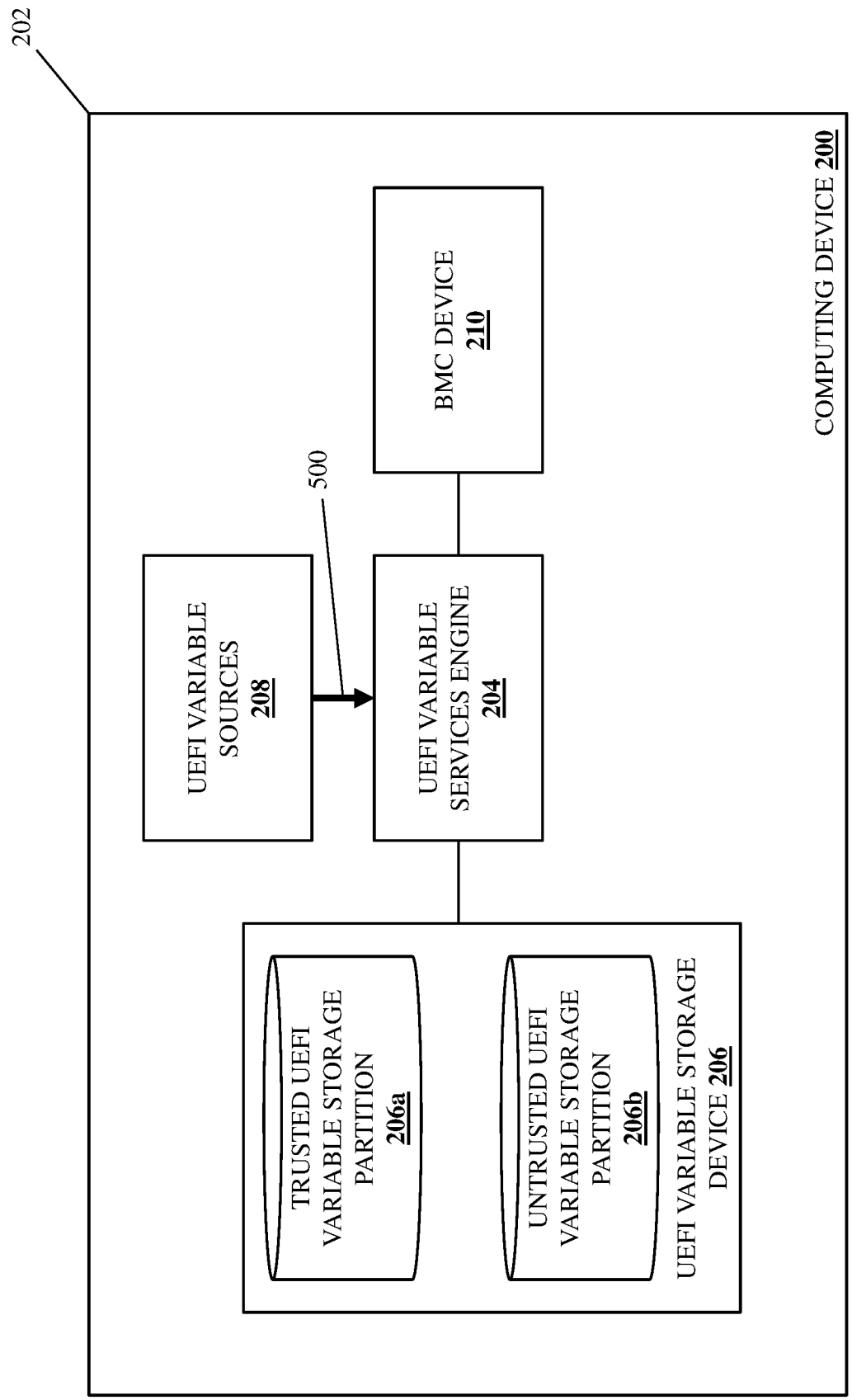
FIG. 5A is a schematic view illustrating an embodiment of the operation of the computing device of FIG. 2 during the method of FIG. 3.

With reference to FIG. 5A, in another embodiment of block 304, one of the UEFI variable sources 208 may perform UEFI variable provisioning operations 500 that may include generating/creating a UEFI variable and transmitting that UEFI variable such that it is received by the UEFI variable services engine 204 in the computing device 200. For example, at block 304, the UEFI variable source may utilize the "SetVariable( )" UEFI variable services provided by the UEFI variable services engine 204 to provide the UEFI variable. As discussed below and as will be appreciated by one of skill in the art in possession of the present disclosure, in examples in which the UEFI variable is received at block 304 relatively later in the UEFI initialization process (i.e., subsequent to the untrusted UEFI variable source point in the UEFI initialization process discussed below), that UEFI variable may be provided by "untrusted" UEFI variable sources such as drivers provided using third party code, and thus may be part of a denial-of-service attack that is configured to use up all remaining storage space in the UEFI variable storage device 206 in order to prevent other UEFI variable sources from storing their UEFI variables therein.

The method 300 then proceeds to decision block 306 where it is determined whether the UEFI initialization process has reached an untrusted UEFI variable source point. In an embodiment, at decision block 306, the UEFI variable services engine 204 in the computing device 200 may determine whether the UEFI initialization process that began at block 302 has reached an untrusted UEFI variable source point. In one example, the untrusted UEFI variable source point in the UEFI initialization process may be defined as a Boot Device Selection (BDS) point in the UEFI initialization process, which one of skill in the art in possession of the present disclosure will appreciate is part of the Direct execution Environment (DXE) stage of the UEFI initialization process and provides for the initialization of initialization/boot devices in the computing device 200, the execution of UEFI drivers or Option Read-Only Memories (ROMs) in Peripheral Component Interconnect (PCI) devices in the computing device 200 according to a system configuration, the processing of boot options in the computing device 200, and/or the performance of other BDS operations that would be apparent to one of skill in the art in possession of the present disclosure.

As will be appreciated by one of skill in the art in possession of the present disclosure, in embodiments in which UEFI Secure Boot is disabled in the computing device 200, the BDS point in the UEFI initialization process may define whether a UEFI variable source 208 is trusted or untrusted. For example, UEFI variable sources such as BIOS/UEFI drivers that are loaded prior to the BDS point in the UEFI initialization process may be provided from the BIOS image itself, and thus may be considered "trusted" BIOS internal drivers that provide UEFI variables that are most likely infrastructural UEFI variables that are required for completing the UEFI initialization process. To contrast, UEFI variable sources such as drivers that are loaded subsequent to the BDS point in the UEFI initialization process may be loaded or otherwise provided from third-party code that could provide a malicious driver configured to perform the denial-of-service attacks discussed above.

In another example, the untrusted UEFI variable source point in the UEFI initialization process may be defined as an Exit Boot Services point in the UEFI initialization process, which one of skill in the art in possession of the present disclosure will appreciate provides for the passing of the control of the computing device 200 to an operating system. As will be appreciated by one of skill in the art in possession of the present disclosure, in embodiments in which UEFI Secure Boot is enabled in the computing device 200, the Exit Boot Services point in the UEFI initialization process may define whether a UEFI variable source 208 is trusted or untrusted. For example, UEFI variable sources loaded prior to the Exit Boot Services point in the UEFI initialization process (e.g., provided from the BIOS image or third party code) will be authenticated via UEFI Secure Boot operations, and thus may be considered "trusted". To contrast, UEFI variable sources such as drivers that are loaded subsequent to the Exit Boot Services point in the UEFI initialization process (e.g., operating system drivers) will not be authenticated, and thus may be considered "untrusted" as they could, for example, write/modify UEFI variables in the UEFI variable storage device 206 to perform the denial-of-service attacks discussed above.

As such, at decision block 306, the UEFI variable services engine 204 in the computing device 200 may determine whether the UEFI initialization process begun at block 302 has reached the BDS point (e.g., in examples in which UEFI Secure Boot is disabled in the computing device 200), or whether the UEFI initialization process begun at block 302 has reached the Exit Boot Services point (e.g., in examples in which UEFI Secure Boot is enabled in the computing device 200). However, while two specific examples of untrusted UEFI variable source points have been described, one of skill in the art in possession of the present disclosure will appreciate how the point in the UEFI initialization process at which UEFI variable sources (and their corresponding UEFI variables) may be "trusted" or "untrusted" may be defined in a variety of manners that will fall within the scope of the present disclosure as well (e.g., any point in the UEFI initialization process at which the "untrusted" UEFI variable sources are provided and/or provide UEFI variables for storage in the UEFI variable storage device 206 may be defined as the untrusted UEFI variable source point while remaining within the scope of the present disclosure).

Figure 4B:
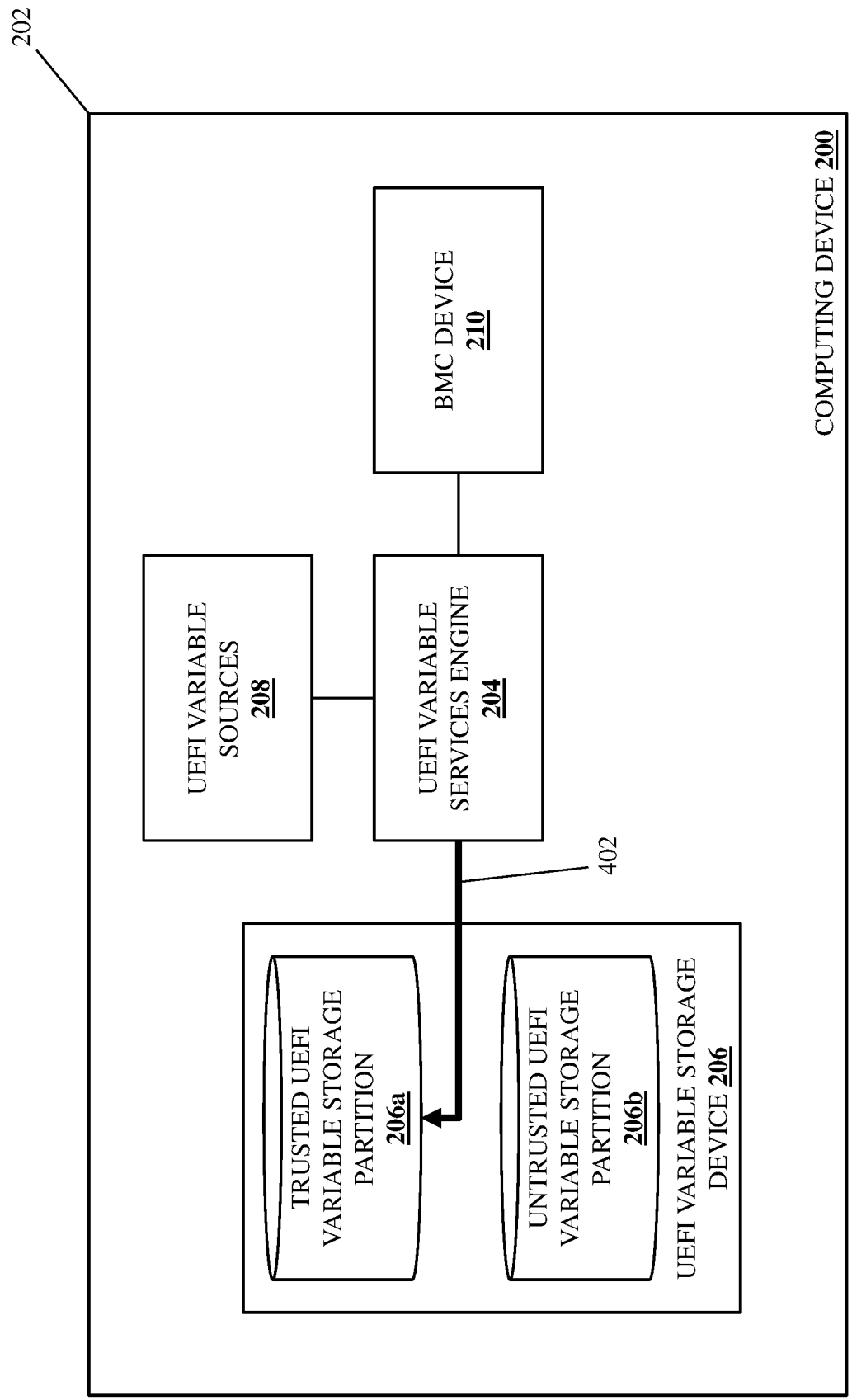
FIG. 4B is a schematic view illustrating an embodiment of the operation of the computing device of FIG. 2 during the method of FIG. 3.

If, at decision block 306, it is determined that the UEFI initialization process has not reached the untrusted UEFI variable source point, the method 300 proceeds to block 308 where the UEFI variable services subsystem stores the UEFI variable in a trusted UEFI variable storage subsystem. With reference to FIG. 4B, in an embodiment of block 308 and in response to determining that the UEFI initialization process begun at block 302 has not reached the untrusted UEFI variable source point, the UEFI variable services engine 204 may perform trusted UEFI variable storage operations 402 that include storing the UEFI variable received at block 304 in the trusted UEFI variable storage partition 206*a* provided in the UEFI variable storage device 206. As such, continuing with the specific examples provided above, a UEFI variable received prior to the BDS point in the UEFI initialization process (e.g., in examples in which UEFI Secure Boot is disabled in the computing device 200), or a UEFI variable received prior to the Exit Boot Services point in the UEFI initialization process (e.g., in examples in which UEFI Secure Boot is enabled in the computing device 200) may be stored in the trusted UEFI variable storage partition 206*a* provided in the UEFI variable storage device 206.

Figure 4C:
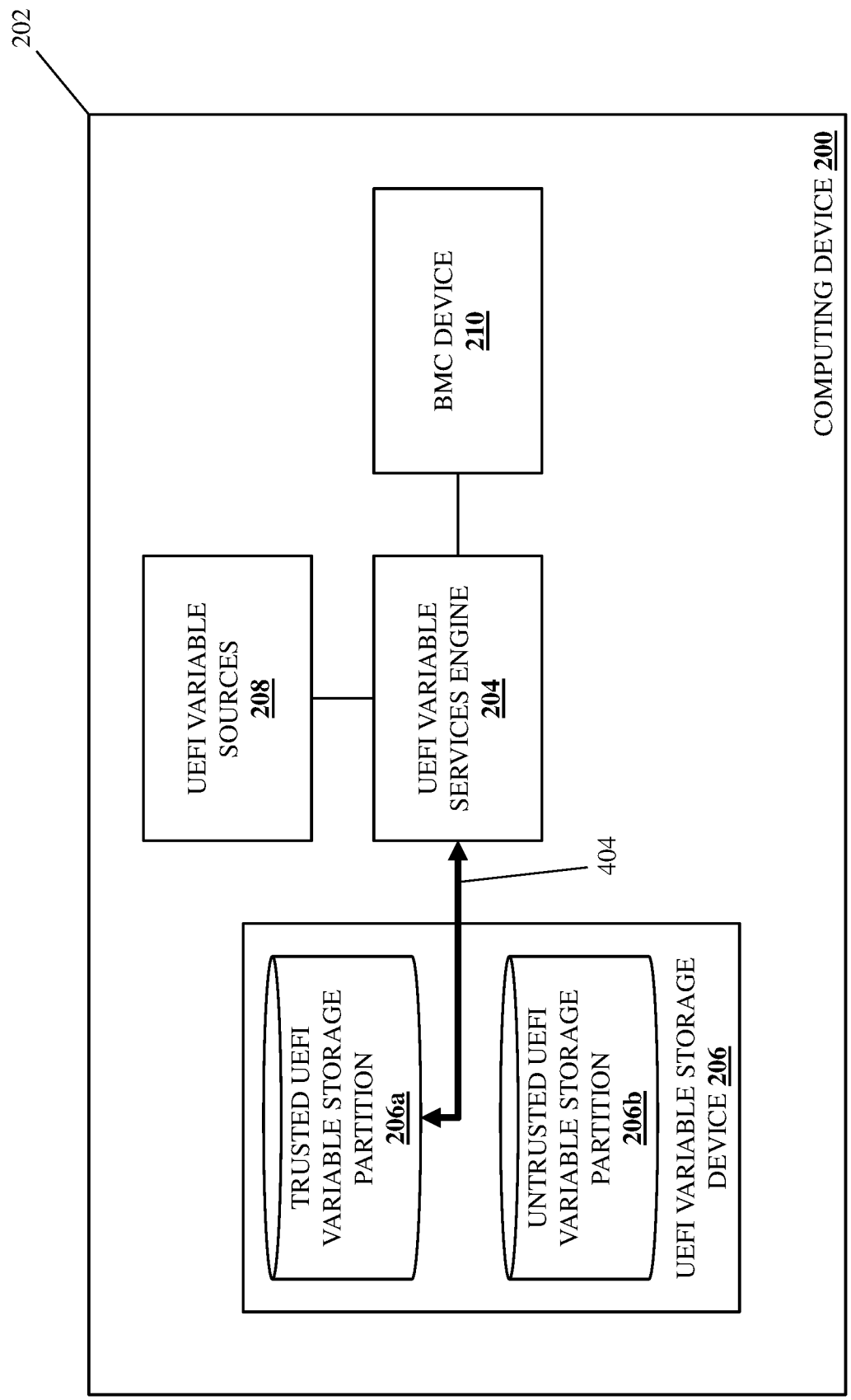
FIG. 4C is a schematic view illustrating an embodiment of the operation of the computing device of FIG. 2 during the method of FIG. 3.

The method 300 then proceeds to decision block 310 where it is determined whether available space in the trusted UEFI variable storage subsystem is below one or more thresholds. With reference to FIG. 4C, in an embodiment of decision block 310, the UEFI variable services engine 204 may perform available space determination operations 404 that may include the performance of any of a variety of techniques for determining a current amount of available/unused storage space in the trusted UEFI variable storage partition 206a provided in the UEFI variable storage device 206, and comparing that current amount of available/unused storage space to one or more available storage space thresholds. As will be appreciated by one of skill in the art in possession of the present disclosure, the trusted UEFI variable storage partition 206a may be allocated an amount of storage space from the UEFI variable storage device 206 for use in storing "trusted" UEFI variables, and that amount of storage space may differ depending on a storage size of "trusted" UEFI variables that must be stored during the UEFI initialization process. Furthermore, the use of the trusted UEFI variable storage partition 206a to store the "trusted" UEFI variable at block 308 will use up some of that storage space, and thus the UEFI variable services engine 204 may determine at decision block 310 an amount of that storage space that is not storing "trusted" UEFI variables and/or that is otherwise available for storing "trusted" UEFI variables.

In a specific example, the available storage space threshold(s) that are compared to the current amount of available/unused storage space in the trusted UEFI variable storage partition 206a provided in the UEFI variable storage device 206 may include a first available storage space threshold that is indicative of a relatively "low" amount of available storage space (e.g., less than 15% of the storage capacity of the trusted UEFI variable storage partition 206a provided in the UEFI variable storage device 206 is available), a second available storage space threshold that is indicative of a relatively "critical" amount of available storage space (e.g., less than 5% of the storage capacity of the trusted UEFI variable storage partition 206a provided in the UEFI variable storage device 206 is available), and a third available storage space threshold that is indicative of a relatively "emergency" amount of available storage space (e.g., less than 1% of the storage capacity of the trusted UEFI variable storage partition 206a provided in the UEFI variable storage device 206 is available). However, while a few specific examples of available storage space thresholds have been described, one of skill in the art in possession of the present disclosure will appreciate how a variety of available storage space thresholds will fall within the scope of the present disclosure as well. Furthermore, while the determination of whether available space in the trusted UEFI variable storage subsystem is below threshold(s) is described as being performed immediately following the storage of a UEFI variable in the trusted UEFI variable storage subsystem, one of skill in the art in possession of the present disclosure will appreciate that it may be determined whether available space in the trusted UEFI variable storage subsystem is below threshold(s) at other times during the method 300 while remaining within the scope of the present disclosure as well.

Figure 5B:
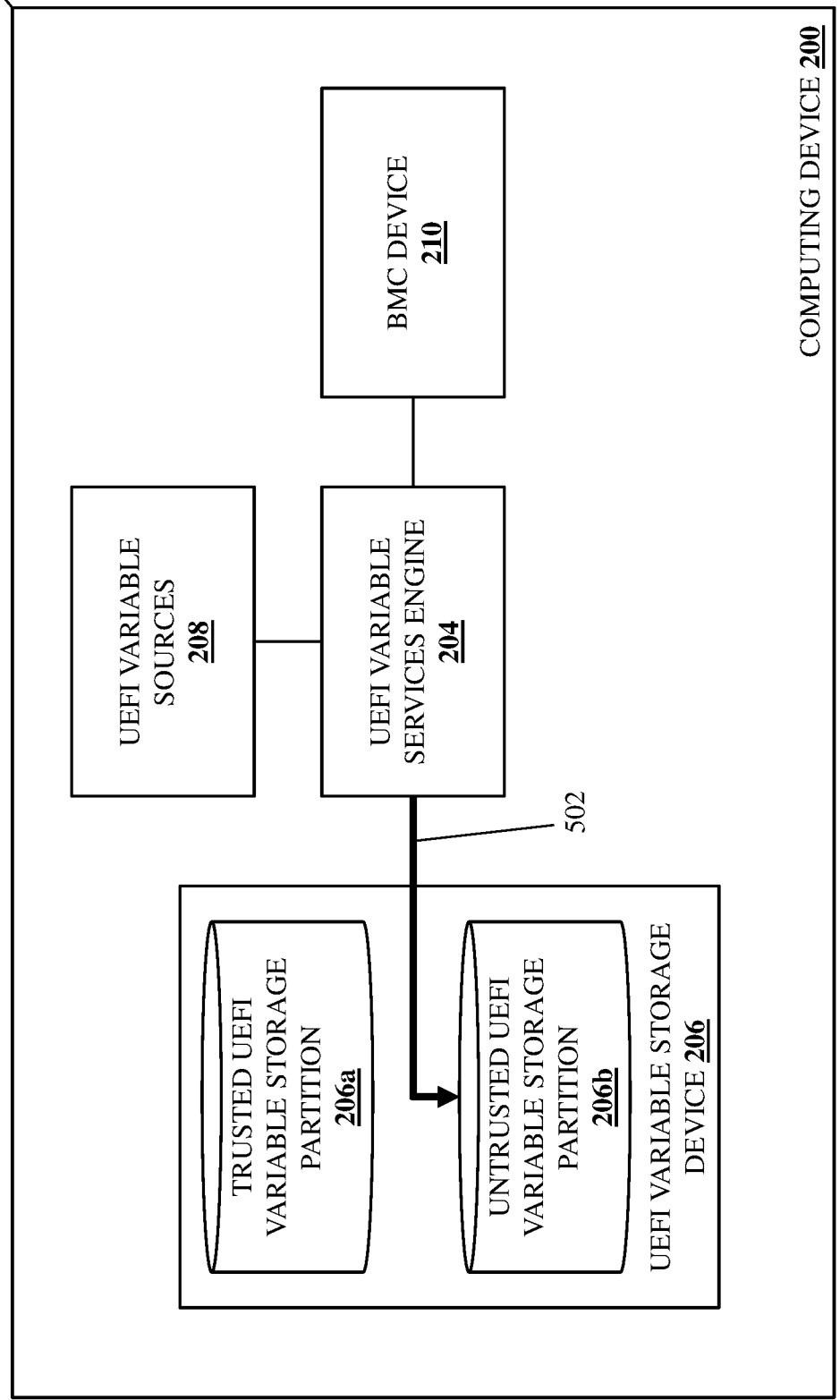
FIG. 5B is a schematic view illustrating an embodiment of the operation of the computing device of FIG. 2 during the method of FIG. 3.

Returning back to decision block 306, if it is determined that the UEFI initialization process has reached the untrusted UEFI variable source point, the method 300 proceeds to block 312 where the UEFI variable services subsystem stores the UEFI variable in an untrusted UEFI variable storage subsystem. With reference to FIG. 5B, in an embodiment of block 312 and in response to determining that the UEFI initialization process begun at block 302 has reached the untrusted UEFI variable source point, the UEFI variable services engine 204 may perform untrusted UEFI variable storage operations 502 that include storing the UEFI variable received at block 304 in the untrusted UEFI variable storage partition 206b provided in the UEFI variable storage device 206. As such, continuing with the specific examples provided above, a UEFI variable received subsequent to the BDS point in the UEFI initialization process (e.g., in examples in which UEFI Secure Boot is disabled in the computing device 200), or a UEFI variable received subsequent to the Exit Boot Services point in the UEFI initialization process (e.g., in examples in which UEFI Secure Boot is enabled in the computing device 200) may be stored in the untrusted UEFI variable storage partition 206b provided in the UEFI variable storage device 206.

As will be appreciated by one of skill in the art in possession of the present disclosure, in the event the "untrusted" UEFI variables stored in the untrusted UEFI variable storage partition 206b at block 312 are provided by malicious UEFI variable source(s) (e.g., malicious driver(s)) as part of a denial-of-service attack, the depletion of the storage space provided by the untrusted UEFI variable storage partition 206b will not affect the storage space provided by the trusted UEFI variable storage partition 206a that is used to store the UEFI variables that are required to complete the UEFI initialization process, thus mitigating the denial-of-service attack and ensuring that the computing device 200 may complete the UEFI initialization process despite the denial-of-service attack.

Figure 5C:
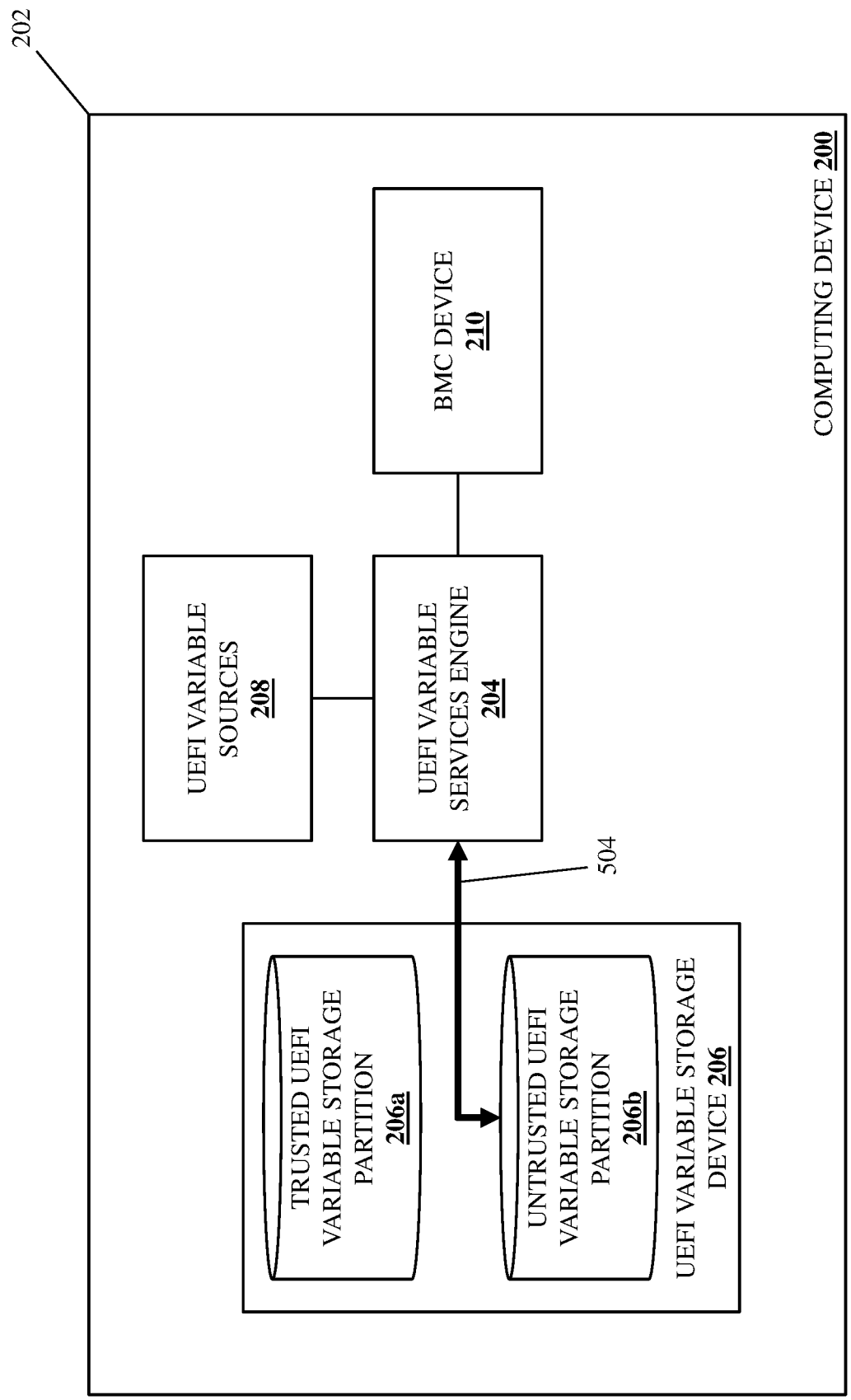
FIG. 5C is a schematic view illustrating an embodiment of the operation of the computing device of FIG. 2 during the method of FIG. 3.

The method 300 then proceeds to decision block 314 where it is determined whether available space in the untrusted UEFI variable storage subsystem is below one or more thresholds. With reference to FIG. 5C, in an embodiment of decision block 314, the UEFI variable services engine 204 may perform available space determination operations 504 that may include any of a variety of techniques for determining a current amount of available/unused storage space in the untrusted UEFI variable storage partition 206b provided in the UEFI variable storage device 206, and comparing that current amount of available unused storage space to one or more available storage space thresholds. As will be appreciated by one of skill in the art in possession of the present disclosure, the untrusted UEFI variable storage partition 206b may be allocated an amount of storage space in the UEFI variable storage device 206 for use in storing "untrusted" UEFI variables, and that amount of storage space may differ depending on storage size of "untrusted" UEFI variables that are expected to be stored during the UEFI initialization process. Furthermore, the use of the untrusted UEFI variable storage partition 206b to store the "untrusted" UEFI variable at block 312 will use up some of that storage space, and thus the UEFI variable services engine 204 may determine at decision block 314 an amount of that storage space that is not storing "untrusted" UEFI variables and/or that is otherwise available for storing "untrusted" UEFI variables.

Similarly as discussed above for the trusted UEFI variable storage partition 206a, the available storage space threshold(s) that are compared to the current amount of available/unused storage space in the untrusted UEFI variable storage partition 206b provided in the UEFI variable storage device 206 may include a first available storage space threshold that is indicative of a relatively "low" amount of available storage space (e.g., less than 15% of the storage capacity of the untrusted UEFI variable storage partition 206b provided in the UEFI variable storage device 206 is available), a second available storage space threshold that is indicative of a relatively "critical" amount of available storage space (e.g., less than 5% of the storage capacity of the untrusted UEFI variable storage partition 206b provided in the UEFI variable storage device 206 is available), and a third available storage space threshold that is indicative of a relatively "emergency" amount of available storage space (e.g., less than 1% of the storage capacity of the untrusted UEFI variable storage partition 206b provided in the UEFI variable storage device 206 is available). However, while a few specific examples of available storage space thresholds have been described, one of skill in the art in possession of the present disclosure will appreciate how a variety of available storage space thresholds will fall within the scope of the present disclosure as well. Furthermore, while the determination of whether available space in the untrusted UEFI variable storage subsystem is below threshold(s) is described as being performed immediately following the storage of a UEFI variable in the untrusted UEFI variable storage subsystem, one of skill in the art in possession of the present disclosure will appreciate that it may be determined whether available space in the untrusted UEFI variable storage subsystem is below threshold(s) at other times during the method 300 while remaining within the scope of the present disclosure as well.

If at decision block 310 it is determined that available space in the trusted UEFI variable storage subsystem is below one or more thresholds, or if at decision block 314 it is determined that available space in the untrusted UEFI variable storage subsystem is below one or more thresholds, the method 300 proceeds to block 316 where the UEFI variable services subsystem performs UEFI variable storage subsystem low space operations. With reference to FIG. 6, in an embodiment of block 316 and in response to determining that the available storage space in either of the trusted UEFI variable storage partition 206a or the untrusted UEFI variable storage partition 206b in the UEFI variable storage device 206 is below a threshold, the UEFI variable services engine 204 may perform UEFI variable storage partition low space operations 600 that may include transmitting an available storage space warning instruction to the BMC device 210. For example, in response to the available storage space in either of the trusted UEFI variable storage partition 206a or the untrusted UEFI variable storage partition 206b in the UEFI variable storage device 206 being below the first available storage space threshold that is indicative of a relatively "low" amount of available storage space, the UEFI variable services engine 204 may transmit an available storage space warning instruction to the BMC device 210 that causes a warning log (e.g., a LifeCycle log) to be generated and stored in the BMC device 210 that identifies that the available storage space in the trusted UEFI variable storage partition 206a or the untrusted UEFI variable storage partition 206b has dropped below the first available storage space threshold.

In another example, in response to the available storage space in either of the trusted UEFI variable storage partition 206a or the untrusted UEFI variable storage partition 206b in the UEFI variable storage device 206 being below the second available storage space threshold that is indicative of a relatively "critical" amount of available storage space, the UEFI variable services engine 204 may transmit an available storage space warning instruction to the BMC device 210 that causes a critical log to be generated and stored in the BMC device 210 that identifies that the available storage space in the trusted UEFI variable storage partition 206a or the untrusted UEFI variable storage partition 206b has dropped below the second available storage space threshold.

In another example, in response to the available storage space in either of the trusted UEFI variable storage partition 206a or the untrusted UEFI variable storage partition 206b in the UEFI variable storage device 206 being below the third available storage space threshold that is indicative of a relatively "emergency" amount of available storage, the UEFI variable services engine 204 may transmit an available storage space warning instruction (e.g., via the BMC device 210, via an operating system (not illustrated) in the computing device 200, etc.) to a user of the computing device 200. To provide a specific example, the available storage space warning instruction transmitted in response to the available storage space in either of the trusted UEFI variable storage partition 206a or the untrusted UEFI variable storage partition 206b being below the third available storage space threshold may allow a user to erase some or all of the data stored in the untrusted UEFI variable storage partition 206b in the UEFI variable storage device 206 (e.g., via an "F1" key or "F2" key selection during POST operations in the computing device 200), to review whether the UEFI variable storage device 206 has experienced an unexpected flooding of data, and/or perform other user-based remediation operations that would be apparent to one of skill in the art in possession of the present disclosure. However, while a few specific examples of available storage space warning instructions have been described, one of skill in the art in possession of the present disclosure will appreciate how a variety of operations may be performed in response to the available storage space in the trusted UEFI variable storage partition 206a or the untrusted UEFI variable storage partition 206b in the UEFI variable storage device 206 being below an available storage space threshold while remaining within the scope of the present disclosure as well.

If at decision block 310 it is determined that available space in the trusted UEFI variable storage subsystem is not below one or more thresholds, or if at decision block 314 it is determined that available space in the untrusted UEFI variable storage subsystem is not below one or more thresholds, or following the UEFI variable storage subsystem low space operations at block 316, the method 300 proceeds to decision block 318 where the method 300 proceeds depending on whether the UEFI initialization process has completed. If at decision block 318, it is determined that the UEFI initialization process has completed, the method 300 proceeds to block 320 where the computing device enters a runtime state. In an embodiment, at block 320 and in response to the UEFI initialization process having completed at decision block 318, the computing device 200 may enter a runtime state in which an operating system controls the computing device 200 If, at decision block 318, the UEFI initialization process has not completed, the method 300 returns to block 304.

As such, the method 300 may loop such that UEFI variables received prior to the untrusted UEFI variable source point in the UEFI initialization process are stored in the trusted UEFI variable storage partition 206a in the UEFI variable storage device 206, UEFI variables received subsequent to the untrusted UEFI variable source point in the UEFI initialization process are stored in the untrusted UEFI variable storage partition 206b in the UEFI variable storage device 206, and UEFI variable storage subsystem low space operations are performed if the available space in either of the trusted UEFI variable storage partition 206a or the untrusted UEFI variable storage partition 206b drops below one or more thresholds, until the UEFI initialization process has completed such that the computing device 200 may enter the runtime state.

Figure 7:
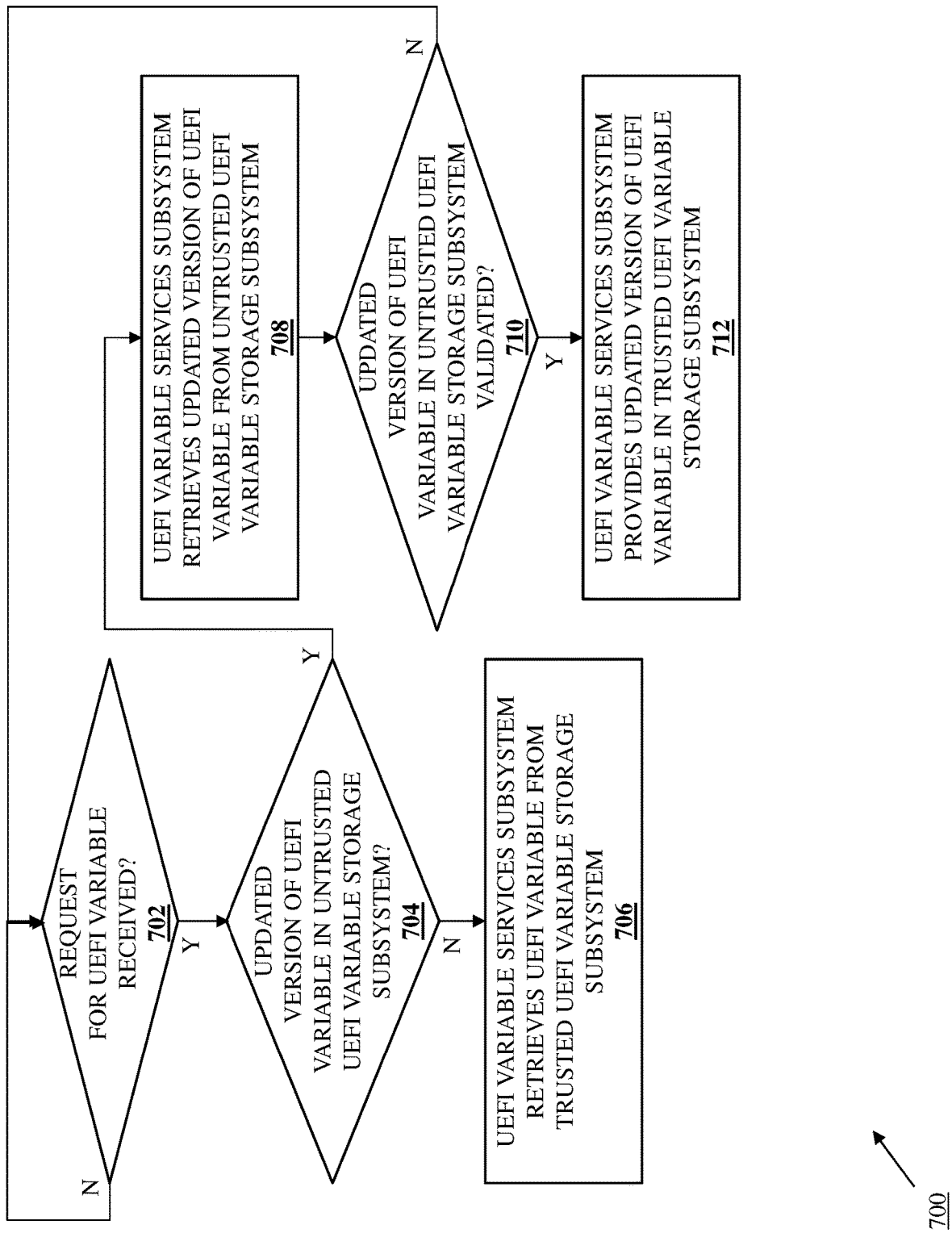
FIG. 7 is a flow chart illustrating an embodiment of a method for storing UEFI variables in a computing device.

Referring now to FIG. 7, an embodiment of a method 700 for storing UEFI variables in a computing device is illustrated. As discussed below, the UEFI variable storage systems and methods of the present disclosure may provide for the updating of UEFI variables stored in the UEFI variable storage device 206 at different times during the UEFI initialization process according to the method 300 discussed above, and the method 700 may be performed to ensure that those updated UEFI variables are stored in a manner that ensures completion of the UEFI initialization process while also protecting the trusted UEFI variable storage partition 206a provided in the UEFI variable storage device 206 from malicious UEFI variable sources, denial-of-service attacks, and/or other issues that could prevent the completion of the performance of the UEFI initialization process in the computing device 200.

Figure 8:
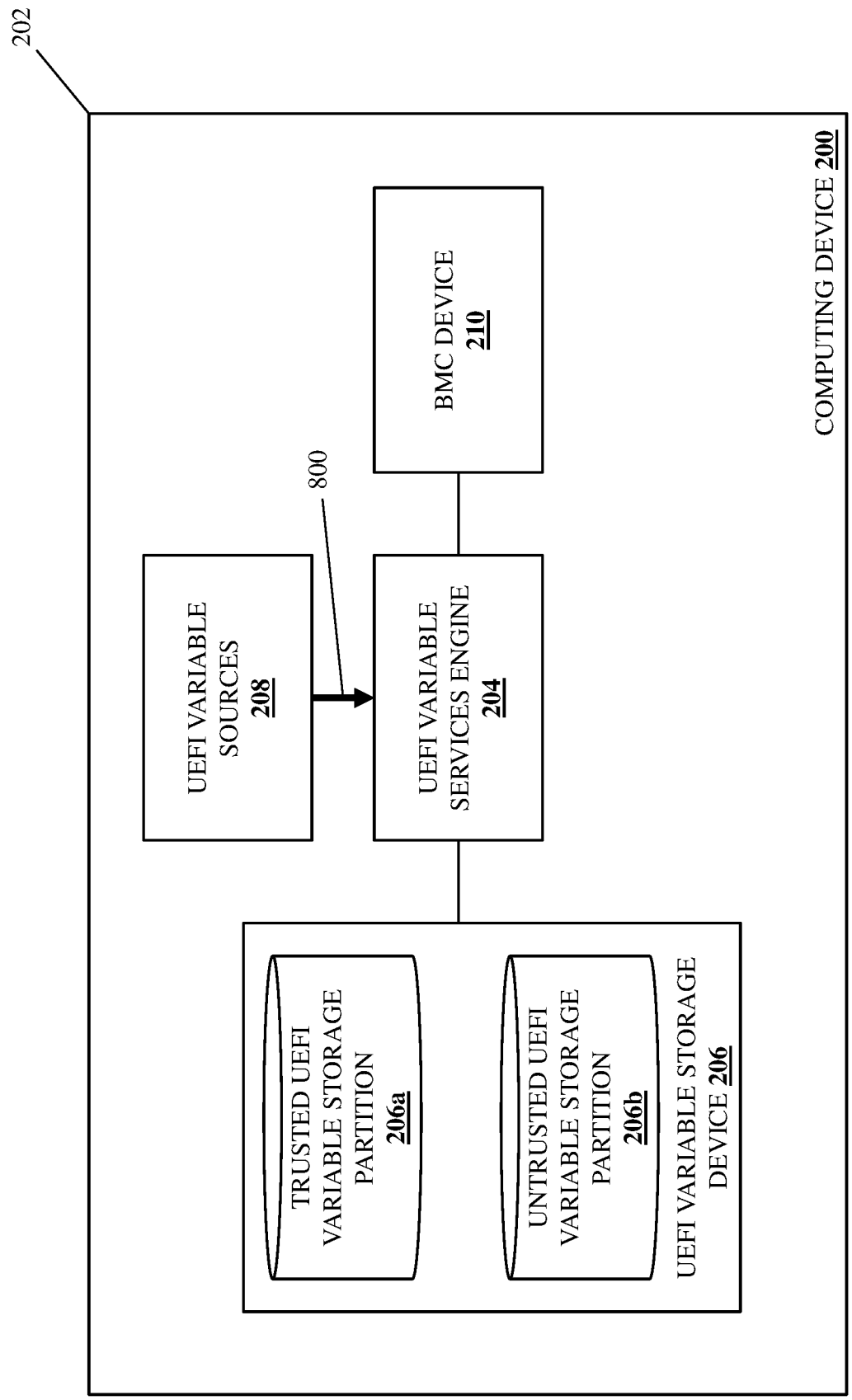
FIG. 8 is a schematic view illustrating an embodiment of the operation of the computing device of FIG. 2 during the method of FIG. 3.

The method 700 begins at decision block 702 where it is determined whether a request for a UEFI variable has been received. In an embodiment, at decision block 702, the UEFI variable services engine 204 in the computing device 200 may monitor for requests for UEFI variables at decision block 702. For example, as illustrated in FIG. 8, any of the UEFI variable sources 208 may perform UEFI variable request operations 800 that include transmitting a request for UEFI variable(s) that were previously provided by that UEFI variable source to the UEFI variable services engine 204 (e.g., using a "GetVariable( )" UEFI variable services provided by the UEFI variable services engine 204 to request the UEFI variable during a UEFI initialization process and/or a runtime state of the computing device 200). If, at decision block 702, it is determined that a request for a UEFI variable has not been received, the method 700 returns to decision block 702. As such, the method 700 may loop such that the UEFI variable services engine 204 continues to monitor for requests for UEFI variables until a request for a UEFI variable is received.

If, at decision block 702, it is determined that a request for a UEFI variable has been received, the method 700 proceeds to decision block 704 where it is determined whether an updated version of the UEFI variable is in the untrusted UEFI variable storage subsystem. In an embodiment, at decision block 704, the UEFI variable services engine 204 in the computing device 200 may determine whether an updated version of the UEFI variable requested at block 702 is stored in the untrusted UEFI variable storage partition 206b in the UEFI variable storage device 206. As will be appreciated by one of skill in the art in possession of the present disclosure, if a UEFI variable stored in the trusted UEFI variable storage partition 206a in the UEFI variable storage device 206 is updated subsequent to the UEFI initialization process reaching the untrusted UEFI variable source point discussed above, that updated UEFI variable will be stored in the untrusted UEFI variable storage partition 206b in the UEFI variable storage device 206. As such, in response to a request for a UEFI variable, the UEFI variable services engine 204 may determine whether an updated version of that UEFI variable is stored in the untrusted UEFI variable storage partition 206b.

Figure 9:
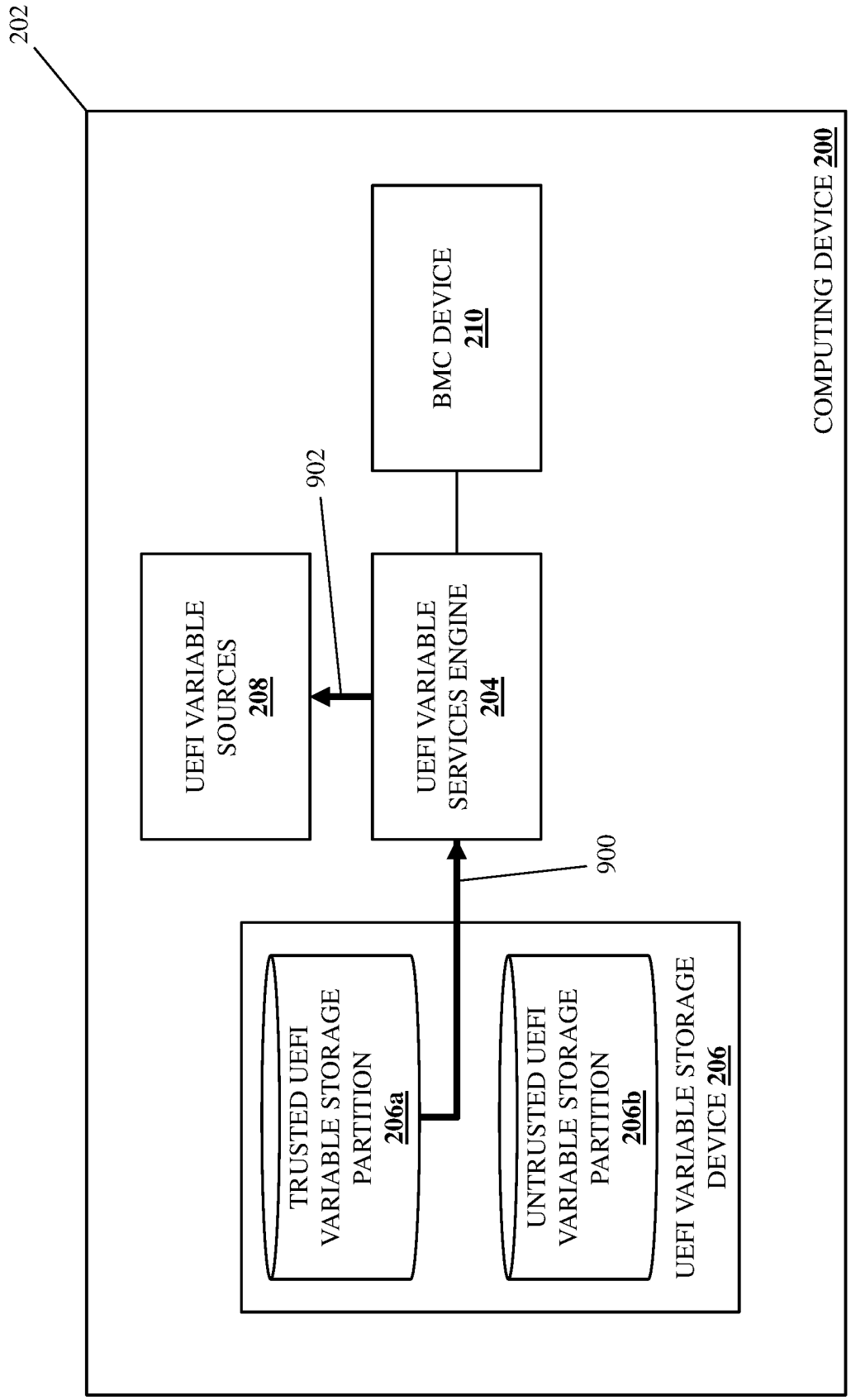
FIG. 9 is a schematic view illustrating an embodiment of the operation of the computing device of FIG. 2 during the method of FIG. 3.

If, at decision block 704, it is determined that an updated version of the UEFI variable is not stored in the untrusted UEFI variable storage subsystem, the method 700 proceeds to block 706 where the UEFI variable services subsystem retrieves the UEFI variable from the trusted UEFI variable storage subsystem. Referring now to FIG. 9, in an embodiment of block 706 and in response to determining that an updated version of a UEFI variable requested at block 702 is not stored in the untrusted UEFI variable storage partition 206b, the UEFI variable services engine 204 in the computing device 200 may perform UEFI variable retrieval operations 900 that include retrieving the UEFI variable requested at block 702 from the trusted UEFI variable storage partition 206a provided in the UEFI variable storage device 206, followed by UEFI variable provisioning operations 902 that include providing that UEFI variable to the one of the UEFI variable sources 208 that requested that UEFI variable.

As will be appreciated by one of skill in the art in possession of the present disclosure, the example of block 706 assumes that the UEFI variable that is requested at block 702 is stored in the trusted UEFI variable storage partition 206a provided in the UEFI variable storage device 206 (and thus is retrieved from the trusted UEFI variable storage partition 206a in the event an updated version of that UEFI variable is not stored in the untrusted UEFI variable storage partition 206b). However, one of skill in the art in possession of the present disclosure will also appreciate how, if the UEFI variable that is requested at block 702 is stored in the untrusted UEFI variable storage partition 206a provided in the UEFI variable storage device 206, that UEFI variable will be retrieved from the untrusted UEFI variable storage partition 206a.

Figure 10:
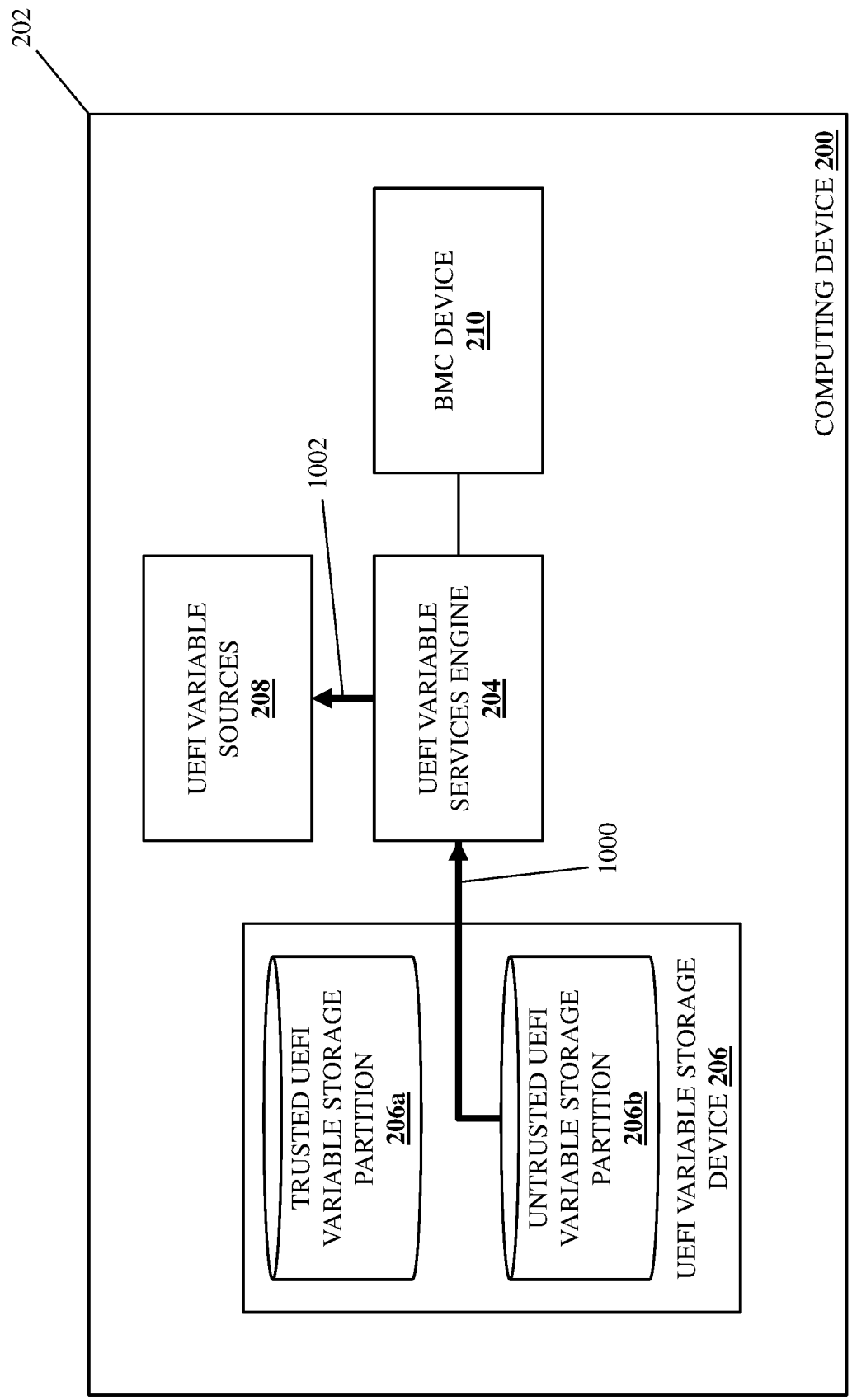
FIG. 10 is a schematic view illustrating an embodiment of the operation of the computing device of FIG. 2 during the method of FIG. 3.

If, at decision block 704, it is determined that an updated version of the UEFI variable is in the untrusted UEFI variable storage subsystem, the method 700 proceeds to block 708 where the UEFI variable services subsystem retrieves the UEFI variable from the untrusted UEFI variable storage subsystem. Referring now to FIG. 10, in an embodiment of block 708 and in response to determining that an updated version of a UEFI variable requested at block 702 is stored in the untrusted UEFI variable storage partition 206b, the UEFI variable services engine 204 in the computing device 200 may perform UEFI variable retrieval operations 1000 that include retrieving the UEFI variable requested at block 702 from the untrusted UEFI variable storage partition 206b in the UEFI variable storage device 206, followed by UEFI variable provisioning operations 1002 that include providing that UEFI variable to the one of the UEFI variable sources 208 that requested that UEFI variable.

The method 700 then proceeds to decision block 710 where it is determined whether the updated version of the UEFI variable in the untrusted UEFI variable storage subsystem has been validated. In an embodiment, at decision block 710, the UEFI variable services engine 204 in the computing device 200 may perform UEFI variable validation operations that include validating the updated version of the UEFI variable stored in the untrusted UEFI variable storage partition 206b in the UEFI variable storage device 206. For example, an updated version of a UEFI variable stored in the untrusted variable storage partition 206b of the UEFI variable storage device 206 may be validated in a variety of manners. For example, following the storage of an updated version of a UEFI variable in the untrusted variable storage partition 206b, the computing device 200 may be reset, rebooted, and/or otherwise initialized, and the UEFI variable services engine 204 in the computing device 200 may validate the updated version of the UEFI variable stored in the untrusted variable storage partition 206b using any of a variety of techniques that may be specific to that UEFI variable (e.g., by having the UEFI variable source that provided that UEFI variable validate that UEFI variable).

In a specific example, the UEFI variable services engine 204 in the computing device 200 may validate the updated version of the UEFI variable stored in the untrusted variable storage partition 206b by determining whether a size of the updated version of the UEFI variable stored in the untrusted variable storage partition 206b is below a size threshold. As discussed above, one concern with the storage of UEFI variables in the UEFI variable storage device 206 is the possibility of denial-of-service attacks that attempt to use up all of the storage space in the UEFI variable storage device 206, and thus a determination that the size of the updated version of the UEFI variable stored in the untrusted variable storage partition 206b is below the size threshold (and thus is not indicative of a malicious UEFI variable provided by a malicious UEFI variable source) may be used to validate the updated version of the UEFI variable for storage in the trusted UEFI variable storage partition 206a as discussed below. However, while a few specific examples have been described, one of skill in the art in possession of the present disclosure will appreciate how an updated version of a UEFI variable stored in the untrusted UEFI variable storage partition 206b may be validated for storage in the trusted UEFI variable storage partition 206a using a variety of techniques that will fall within the scope of the present disclosure as well.

Figure 11:
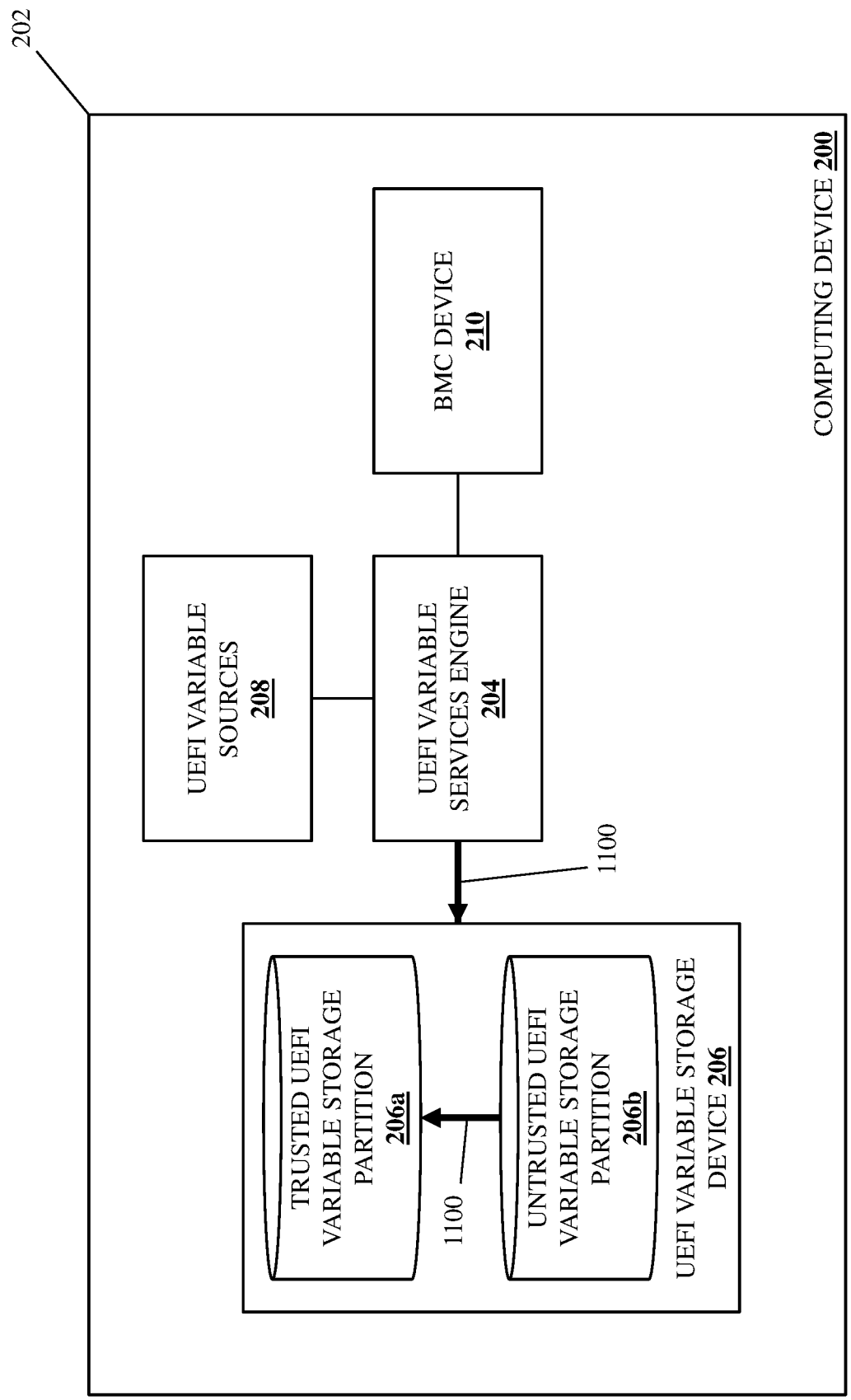
FIG. 11 is a schematic view illustrating an embodiment of the operation of the computing device of FIG. 2 during the method of FIG. 3.

If, at decision block 710, it is determined that the updated version of the UEFI variable in the untrusted UEFI variable storage subsystem has been validated, the method 700 proceeds to block 712 where the UEFI variable services subsystem provides the updated version of the UEFI variable in the trusted UEFI variable storage subsystem. With reference to FIG. 11, in an embodiment of block 712, the UEFI variable services engine 204 in the computing device 200 may perform updated UEFI variable provisioning operations 1100 that may include copying the updated version of the UEFI variable that was stored in the untrusted UEFI variable storage partition 206b in the UEFI variable storage device 206 to the trusted UEFI variable storage partition 206a, and erasing the updated version of the UEFI variable from the untrusted UEFI variable storage partition 206b. If, at decision block 710, it is determined that the updated version of the UEFI variable in the untrusted UEFI variable storage subsystem has not been validated, the method 700 returns to decision block 702. As will be appreciated by one of skill in the art in possession of the present disclosure, in the event the updated version of the UEFI variable that was stored in the untrusted UEFI variable storage partition 206b in the UEFI variable storage device 206 cannot be validated, that updated version of the UEFI variable will remain in the untrusted UEFI variable storage partition 206b.

As will be appreciated by one of skill in the art in possession of the present disclosure, an updated version of a UEFI variable (or a newly created UEFI variable) that was stored in the untrusted UEFI variable storage partition 206b in the UEFI variable storage device 206 in response to being received subsequent to the UEFI initialization process reaching the untrusted UEFI variable source point may be subsequently provided in the trusted UEFI variable storage partition 206b without the need for the validation discussed above. For example, in the event that UEFI variable is provided by a UEFI variable source 208 prior to the untrusted UEFI variable source point in the UEFI initialization process (e.g., during a subsequent UEFI initialization process that is subsequent to a previous UEFI initialization process during which the updated/newly created UEFI variable was stored in the untrusted UEFI variable storage partition 206b), that UEFI variable will be stored in the trusted UEFI variable storage partition 206a as per the method 300, and the copy of that UEFI variable in the untrusted UEFI variable storage partition 206b may be erased from the untrusted UEFI variable storage partition 206b.

Thus, systems and methods have been described that provide separate storage subsystems for "trusted" UEFI variables received before an untrusted UEFI variable source point in a UEFI initialization process and "untrusted" UEFI variables received after the untrusted UEFI variable source point in a UEFI initialization process. For example, the UEFI variable storage system of the present disclosure may include a UEFI variable services subsystem coupled to UEFI variable sources, a trusted UEFI variable storage subsystem, and an untrusted UEFI variable storage subsystem. If the UEFI variable services subsystem receives a first UEFI variable during a first UEFI initialization process from a first UEFI variable source and determines that the first UEFI initialization process has not reached an untrusted UEFI variable source point, it stores the first UEFI variable in the trusted UEFI variable storage subsystem. If the UEFI variable services subsystem receives a second UEFI variable during the first UEFI initialization process from a second UEFI variable source and determines that the first UEFI initialization process has reached the untrusted UEFI variable source point, it stores the second UEFI variable in the untrusted UEFI variable storage subsystem. As such, "untrusted" UEFI variable sources that are provided relatively later in the UEFI initialization process are unable to fill the "trusted" UEFI variable storage subsystem with "untrusted" UEFI variables (e.g., in a denial-of-service attack), ensuring the availability of the "trusted" UEFI variables required to complete the UEFI initialization process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Unified Extensible Firmware Interface (UEFI) variable storage system, comprising:
   a plurality of Unified Extensible Firmware Interface (UEFI) variable sources;
   a trusted UEFI variable storage subsystem;
   an untrusted UEFI variable storage subsystem; and
   a UEFI variable services subsystem that is coupled to the plurality of UEFI variable sources, the trusted UEFI variable storage subsystem, and the untrusted UEFI variable storage subsystem, wherein the UEFI variable services subsystem is configured to:
      receive, during a first UEFI initialization process from a first UEFI variable source that is included in the plurality of UEFI variable sources, a first UEFI variable;
      determine, in response to receiving the first UEFI variable, that the first UEFI initialization process has not reached an untrusted UEFI variable source point and, in response, store the first UEFI variable in the trusted UEFI variable storage subsystem;
      receive, during the first UEFI initialization process from a second UEFI variable source that is included in the plurality of UEFI variable sources, a second UEFI variable; and
      determine, in response to receiving the second UEFI variable, that the first UEFI initialization process has reached the untrusted UEFI variable source point and, in response, store the second UEFI variable in the untrusted UEFI variable storage subsystem.

2. The system of claim 1, wherein the untrusted UEFI variable source point includes a Boot Device Selection (BDS) point in the UEFI initialization process.

3. The system of claim 1, wherein the untrusted UEFI variable source point includes an Exit Boot Services point in the UEFI initialization process.

4. The system of claim 1, wherein the trusted UEFI variable storage subsystem includes a trusted UEFI variable storage partition in a Basic Input/Output System (BIOS) Serial Peripheral Interface (SPI) storage device, and wherein the untrusted UEFI variable storage subsystem includes an untrusted UEFI variable storage partition in the BIOS SPI storage device.

5. The system of claim 1, wherein the UEFI variable services subsystem is configured to:
receive, during the first UEFI initialization process from a third UEFI variable source that is included in the plurality of UEFI variable sources, an update to a third UEFI variable that is stored in the trusted UEFI variable storage subsystem;
determine, in response to receiving the update to the third UEFI variable, that the first UEFI initialization process has reached the untrusted UEFI variable source point and, in response, store the update to the third UEFI variable in the untrusted UEFI variable storage subsystem to provide an updated third UEFI variable in the untrusted UEFI variable storage subsystem;
validate, during a second UEFI initialization process that is subsequent to the first UEFI initialization process, the updated third UEFI variable stored in the untrusted UEFI variable storage subsystem; and
store, in response to validating the updated third UEFI variable, the updated third UEFI variable in the trusted UEFI variable storage subsystem.

6. The system of claim 5, wherein the UEFI variable services subsystem is configured to:
receive, from the third UEFI variable source subsequent to storing the updated third UEFI variable in the untrusted UEFI variable storage subsystem and prior to the second UEFI initialization process, a request for the third UEFI variable; and
retrieve, in response to receiving the request for the third UEFI variable, the updated third UEFI variable from the untrusted UEFI variable storage subsystem and provide the updated third UEFI variable to the third UEFI variable source.

7. An Information Handling System (IHS), comprising:
a processing system; and
a memory system that is coupled to the processing system and that includes instructions that, when executed by the processing system, cause the processing system to provide a Unified Extensible Firmware Interface (UEFI) variable services engine that is configured to:
receive, during a first UEFI initialization process from a first UEFI variable source, a first UEFI variable;
determine, in response to receiving the first UEFI variable, that the first UEFI initialization process has not reached an untrusted UEFI variable source point and, in response, store the first UEFI variable in a trusted UEFI variable storage subsystem;
receive, during the first UEFI initialization process from a second UEFI variable source, a second UEFI variable; and
determine, in response to receiving the second UEFI variable, that the first UEFI initialization process has reached the untrusted UEFI variable source point and, in response, store the second UEFI variable in an untrusted UEFI variable storage subsystem.

8. The IHS of claim 7, wherein the untrusted UEFI variable source point includes a Boot Device Selection (BDS) point in the UEFI initialization process.

9. The IHS of claim 7, wherein the untrusted UEFI variable source point includes an Exit Boot Services point in the UEFI initialization process.

10. The IHS of claim 7, wherein the trusted UEFI variable storage subsystem includes a trusted UEFI variable storage partition in a Basic Input/Output System (BIOS) Serial Peripheral Interface (SPI) storage device, and wherein the untrusted UEFI variable storage subsystem includes an untrusted UEFI variable storage partition in the BIOS SPI storage device.

11. The IHS of claim 7, wherein the UEFI variable services engine is configured to:
receive, during the first UEFI initialization process from a third UEFI variable source, an update to a third UEFI variable that is stored in the trusted UEFI variable storage subsystem;
determine, in response to receiving the update to the third UEFI variable, that the first UEFI initialization process has reached the untrusted UEFI variable source point and, in response, store the update to the third UEFI variable in the untrusted UEFI variable storage subsystem to provide an updated third UEFI variable in the untrusted UEFI variable storage subsystem;
validate, during a second UEFI initialization process that is subsequent to the first UEFI initialization process, the updated third UEFI variable stored in the untrusted UEFI variable storage subsystem; and
store, in response to validating the updated third UEFI variable, the updated third UEFI variable in the trusted UEFI variable storage subsystem.

12. The IHS of claim 11, wherein the UEFI variable services engine is configured to:
receive, from the third UEFI variable source subsequent to storing the updated third UEFI variable in the untrusted UEFI variable storage subsystem and prior to the second UEFI initialization process, a request for the third UEFI variable; and
retrieve, in response to receiving the request for the third UEFI variable, the updated third UEFI variable from the untrusted UEFI variable storage subsystem and provide the updated third UEFI variable to the third UEFI variable source.

13. The IHS of claim 11, wherein the validating the updated third UEFI variable stored in the untrusted UEFI variable storage subsystem includes determining that a size of the updated third UEFI variable is less than a threshold size.

14. A method for storing Unified Extensible Firmware Interface (UEFI) variables in a computing device, comprising:
receiving, by a Unified Extensible Firmware Interface (UEFI) variable services subsystem during a first UEFI initialization process from a first UEFI variable source, a first UEFI variable;
determining, by the UEFI variable services subsystem in response to receiving the first UEFI variable, that the first UEFI initialization process has not reached an untrusted UEFI variable source point and, in response, storing the first UEFI variable in a trusted UEFI variable storage subsystem;

receiving, by the UEFI variable services subsystem during the first UEFI initialization process from a second UEFI variable source, a second UEFI variable; and determining, by the UEFI variable services subsystem in response to receiving the second UEFI variable, that the first UEFI initialization process has reached the untrusted UEFI variable source point and, in response, storing the second UEFI variable in an untrusted UEFI variable storage subsystem.

15. The method of claim 14, wherein the untrusted UEFI variable source point includes a Boot Device Selection (BDS) point in the UEFI initialization process.

16. The method of claim 14, wherein the untrusted UEFI variable source point includes an Exit Boot Services point in the UEFI initialization process.

17. The method of claim 14, wherein the trusted UEFI variable storage subsystem includes a trusted UEFI variable storage partition in a Basic Input/Output System (BIOS) Serial Peripheral Interface (SPI) storage device, and wherein the untrusted UEFI variable storage subsystem includes an untrusted UEFI variable storage partition in the BIOS SPI storage device.

18. The method of claim 14, further comprising:
receiving, by the UEFI variable services subsystem during the first UEFI initialization process from a third UEFI variable source, an update to a third UEFI variable that is stored in the trusted UEFI variable storage subsystem;

determining, by the UEFI variable services subsystem in response to receiving the update to the third UEFI variable, that the first UEFI initialization process has reached the untrusted UEFI variable source point and, in response, storing the update to the third UEFI variable in the untrusted UEFI variable storage subsystem to provide an updated third UEFI variable in the untrusted UEFI variable storage subsystem;

validating, by the UEFI variable services subsystem during a second UEFI initialization process that is subsequent to the first UEFI initialization process, the updated third UEFI variable stored in the untrusted UEFI variable storage subsystem; and storing, by the UEFI variable services subsystem in response to validating the updated third UEFI variable, the updated third UEFI variable in the trusted UEFI variable storage subsystem.

19. The method of claim 18, further comprising:
receiving, by the UEFI variable services subsystem from the third UEFI variable source subsequent to storing the updated third UEFI variable in the untrusted UEFI variable storage subsystem and prior to the second UEFI initialization process, a request for the third UEFI variable; and retrieving, by the UEFI variable services subsystem in response to receiving the request for the third UEFI variable, the updated third UEFI variable from the untrusted UEFI variable storage subsystem and provide the updated third UEFI variable to the third UEFI variable source.

20. The method of claim 14, wherein the validating the updated third UEFI variable stored in the untrusted UEFI variable storage subsystem includes determining that a size of the updated third UEFI variable is less than a threshold size.

* * * * *